(12) United States Patent
Gabel et al.

(10) Patent No.: US 7,558,941 B2
(45) Date of Patent: Jul. 7, 2009

(54) AUTOMATIC DETECTION OF MICRO-TILE ENABLED MEMORY

(75) Inventors: Douglas Gabel, Hillsboro, OR (US); James Akiyama, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 305 days.

(21) Appl. No.: 11/172,766

(22) Filed: Jun. 30, 2005

(65) Prior Publication Data
US 2007/0005890 A1    Jan. 4, 2007

(51) Int. Cl.
G06F 9/26 (2006.01)
G06F 9/34 (2006.01)
G11C 29/00 (2006.01)
G01R 31/28 (2006.01)

(52) U.S. Cl. .......................... 711/217; 714/719; 714/735
(58) Field of Classification Search .................. 711/217; 714/719, 735
See application file for complete search history.

(56) References Cited

U.S. PATENT DOCUMENTS

| | | | |
|---|---|---|---|
| 3,988,717 A | 10/1976 | Kisylia | |
| 4,051,461 A | 9/1977 | Hashimoto et al. | |
| 4,059,850 A | 11/1977 | Van Eck et al. | |
| 4,124,891 A | 11/1978 | Weller, III et al. | |
| 4,495,570 A | 1/1985 | Kitajima et al. | |
| 4,504,902 A | 3/1985 | Gallaher et al. | |
| 5,251,310 A | 10/1993 | Smelser et al. | |
| 5,325,510 A | 6/1994 | Frazier | |
| 5,412,662 A | 5/1995 | Honma et al. | |
| 5,459,842 A | 10/1995 | Begun et al. | |

(Continued)

FOREIGN PATENT DOCUMENTS

DE    3689276 T2    8/1993

(Continued)

OTHER PUBLICATIONS

PCT International Search Report for PCT US/2006/025460, mailed Jul. 2, 2007 (5 pages).

(Continued)

Primary Examiner—Sheng-Jen Tsai
Assistant Examiner—Edward J Dudek
(74) Attorney, Agent, or Firm—Blakely, Sokoloff, Taylor & Zafman LLP

(57) ABSTRACT

In one embodiment of the invention, a write cache line with a unique bit pattern is written into memory in a memory channel at a starting address. An attempt is made to enable micro-tile memory accesses into each memory integrated circuit on memory modules in the memory channel. A read cache line is read from memory in the memory channel at the starting address. The bit patterns of the read cache line and the write cache line are compared. If in the comparison it is determined that the bit pattern of the read cache line differs from the write cache line, then micro-tile memory access is enabled into each memory integrated circuit on memory modules in the memory channel. If in the comparison it is determined that the bit pattern of the read cache line is the same as the bit pattern of the write cache line, then micro-tile memory access is not supported and cannot be enabled in each memory integrated circuit on memory modules in the memory channel.

19 Claims, 13 Drawing Sheets

U.S. PATENT DOCUMENTS

| | | | |
|---|---|---|---|
| 5,526,507 A | 6/1996 | Hill | |
| 5,649,157 A | 7/1997 | Williams | |
| 5,748,554 A * | 5/1998 | Barth et al. | 365/230.03 |
| 5,761,708 A | 6/1998 | Cherabuddi et al. | |
| 5,790,118 A | 8/1998 | Bertram | |
| 5,901,332 A | 5/1999 | Gephardt et al. | |
| 5,905,725 A | 5/1999 | Sindhu et al. | |
| 5,913,231 A | 6/1999 | Lewis et al. | |
| 6,061,773 A | 5/2000 | Harvey et al. | |
| 6,076,139 A | 6/2000 | Welker et al. | |
| 6,108,725 A | 8/2000 | Chatter | |
| 6,122,709 A | 9/2000 | Wicki et al. | |
| 6,145,065 A | 11/2000 | Takahashi et al. | |
| 6,151,641 A | 11/2000 | Herbert | |
| 6,249,851 B1 | 6/2001 | Richardson et al. | |
| 6,389,488 B1 | 5/2002 | Strongin et al. | |
| 6,430,672 B1 | 8/2002 | Dhong et al. | |
| 6,438,675 B1 | 8/2002 | Root et al. | |
| 6,453,380 B1 | 9/2002 | Van Lunteren | |
| 6,606,688 B1 | 8/2003 | Koyanagi et al. | |
| 6,643,746 B1 | 11/2003 | Bouquet | |
| 6,651,151 B2 | 11/2003 | Palanca et al. | |
| 6,708,248 B1 | 3/2004 | Garrett, Jr. et al. | |
| 6,745,272 B2 | 6/2004 | Owen et al. | |
| 6,862,672 B1 | 3/2005 | Furudate et al. | |
| 7,006,505 B1 | 2/2006 | Bleszynski et al. | |
| 7,043,617 B2 * | 5/2006 | Wiliams | 711/170 |
| 7,130,229 B2 | 10/2006 | Dahlen et al. | |
| 3,323,109 A1 | 5/2007 | Hecht et al. | |
| 2002/0078268 A1 | 6/2002 | Lasserre | |
| 2002/0188858 A1 | 12/2002 | Oerlemans | |
| 2003/0056058 A1 | 3/2003 | Veitch | |
| 2003/0142102 A1 | 7/2003 | Emberling | |
| 2003/0179598 A1 * | 9/2003 | Chen | 365/63 |
| 2003/0204679 A1 | 10/2003 | Blankenship | |
| 2003/0225970 A1 | 12/2003 | Hashemi | |
| 2003/0229821 A1 | 12/2003 | Ma | |
| 2004/0044857 A1 | 3/2004 | Jeddeloh et al. | |
| 2004/0078532 A1 | 4/2004 | Tremaine | |
| 2004/0142102 A1 | 7/2004 | Banerjee et al. | |
| 2005/0068844 A1 * | 3/2005 | Roohparvar | 365/238.5 |
| 2005/0080953 A1 | 4/2005 | Oner et al. | |
| 2005/0193293 A1 * | 9/2005 | Shikata | 714/718 |
| 2006/0294264 A1 | 12/2006 | Akiyama et al. | |
| 2006/0294325 A1 * | 12/2006 | Akiyama et al. | 711/154 |
| 2006/0294328 A1 | 12/2006 | Akiyama et al. | |
| 2007/0002668 A1 * | 1/2007 | Williams et al. | 365/230.06 |
| 2007/0008328 A1 * | 1/2007 | MacWilliams et al. | 345/530 |
| 2007/0013704 A1 * | 1/2007 | MacWilliams et al. | 345/542 |

FOREIGN PATENT DOCUMENTS

| | | |
|---|---|---|
| DE | 10216611 A1 | 11/2003 |
| EP | 1 001 347 A | 5/2000 |
| JP | 02067622 | 3/1990 |

OTHER PUBLICATIONS

PCT Written Opinion for PCT US/2006/025460, mailed Jul. 2, 2007 (6 pages).

Office Action U.S. Appl. No. 11/165,390, mailed May 29, 2008., 1-11.

Office Action U.S. Appl. No. 11/172,766, mailed May 27, 2008.

Office Action U.S. Appl. No. 11/159,741, mailed Jul. 31, 2008.

Webopedia, "Main Memory", http://www.webopedia.com/TERM/m/main_memory.html. (Jan. 15, 2002), 1-4.

"IA-32 Intel Architecture Software Developer's Manual", vol. 3: *System Programming Guide*, 9-1 - 9-3.

* cited by examiner

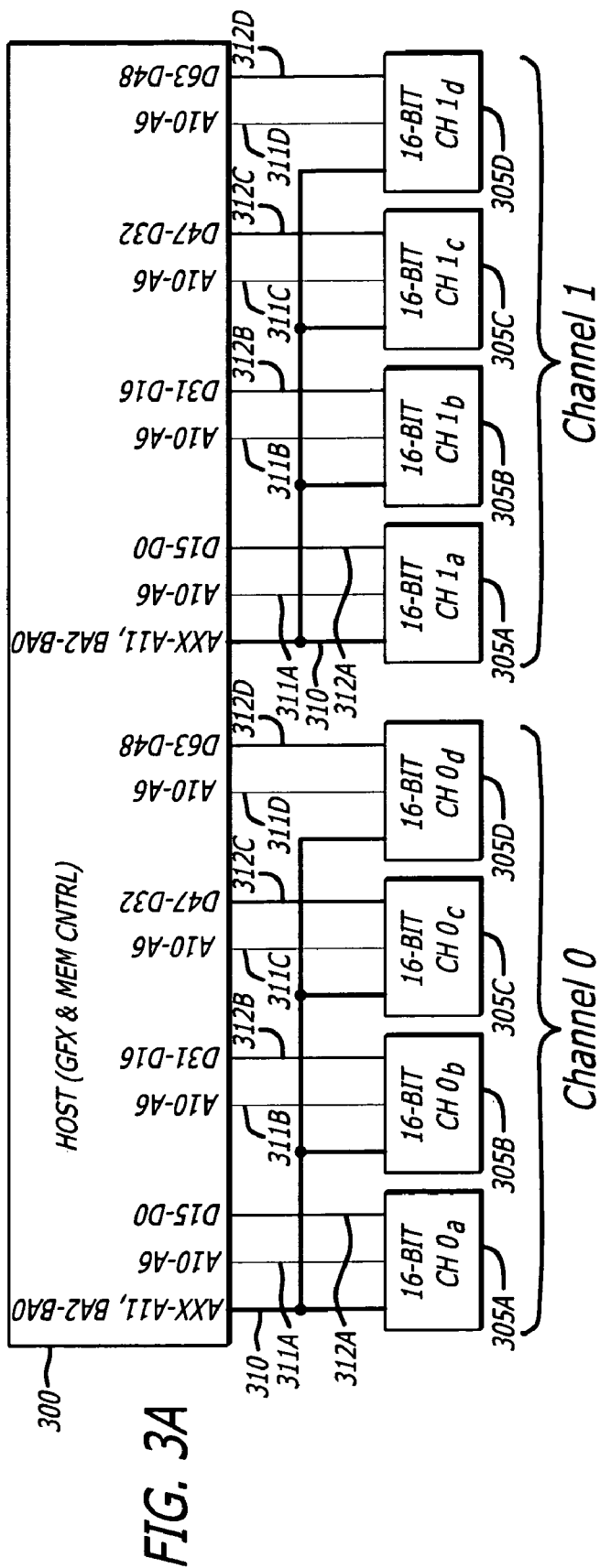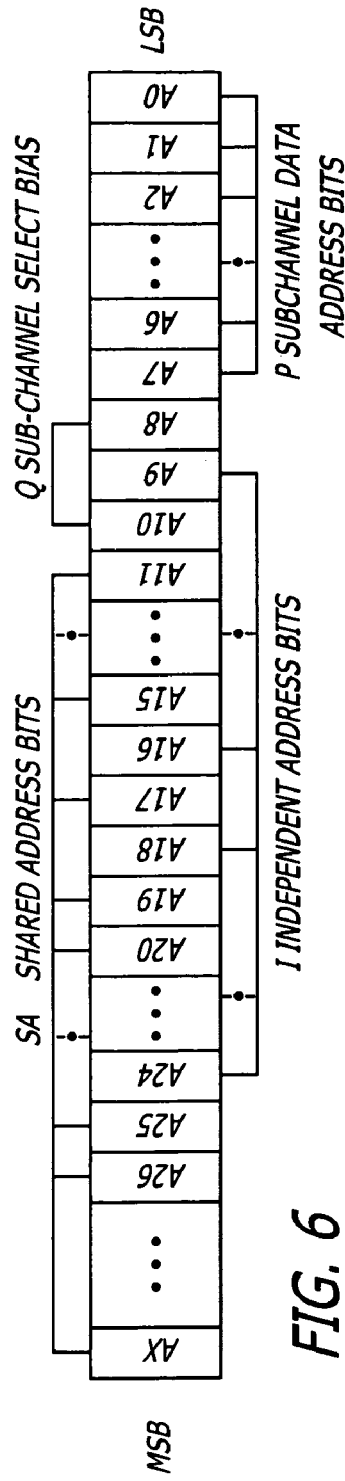
FIG. 3A
FIG. 6

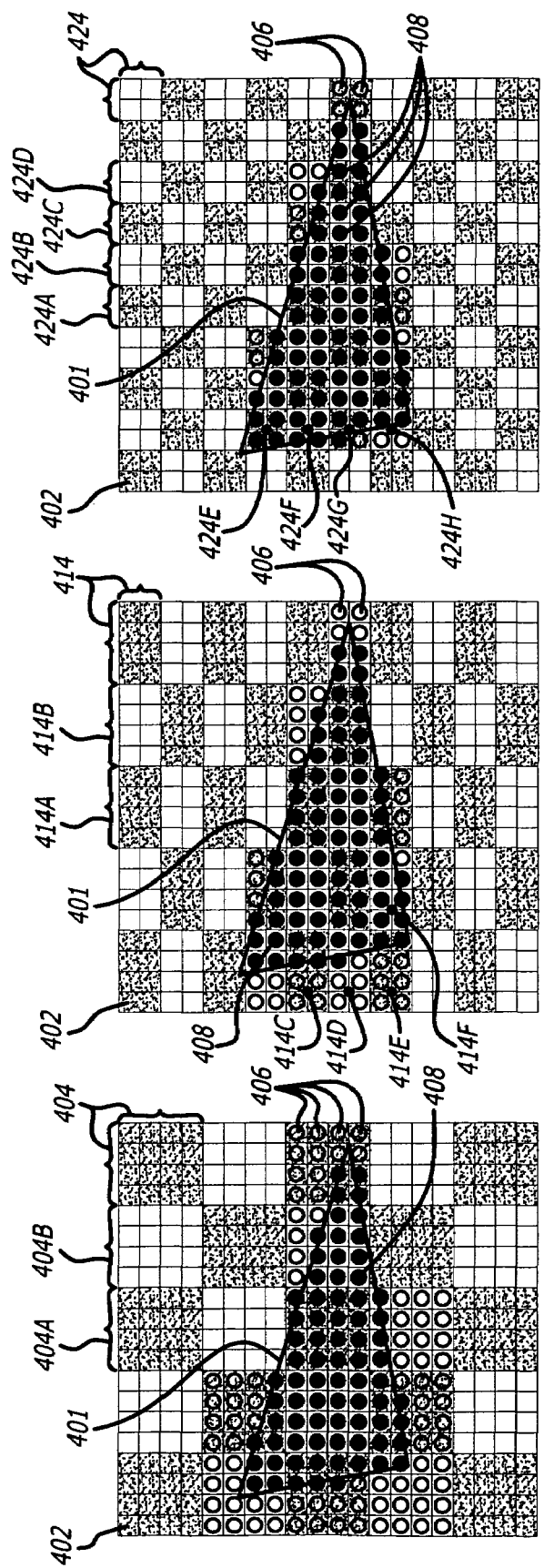

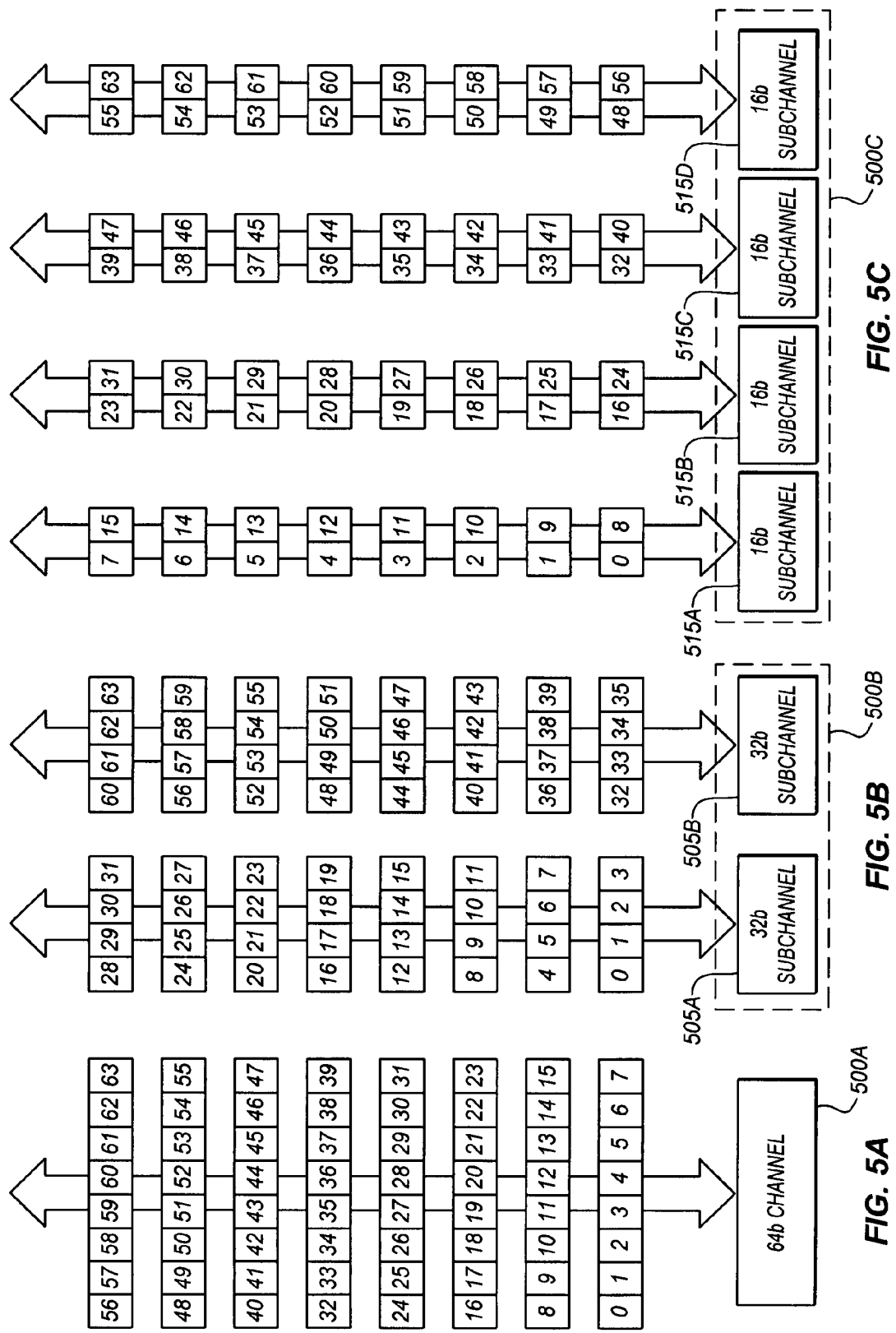

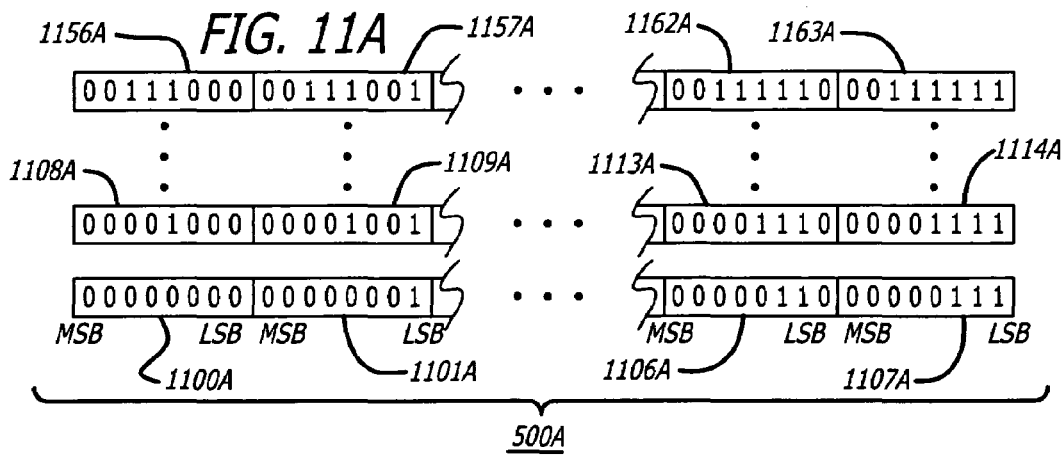
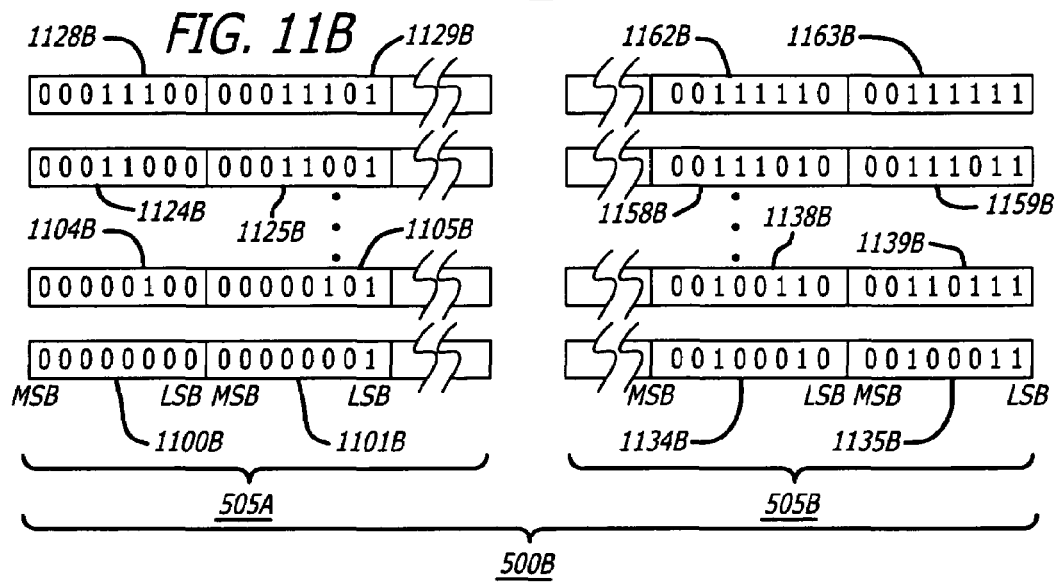
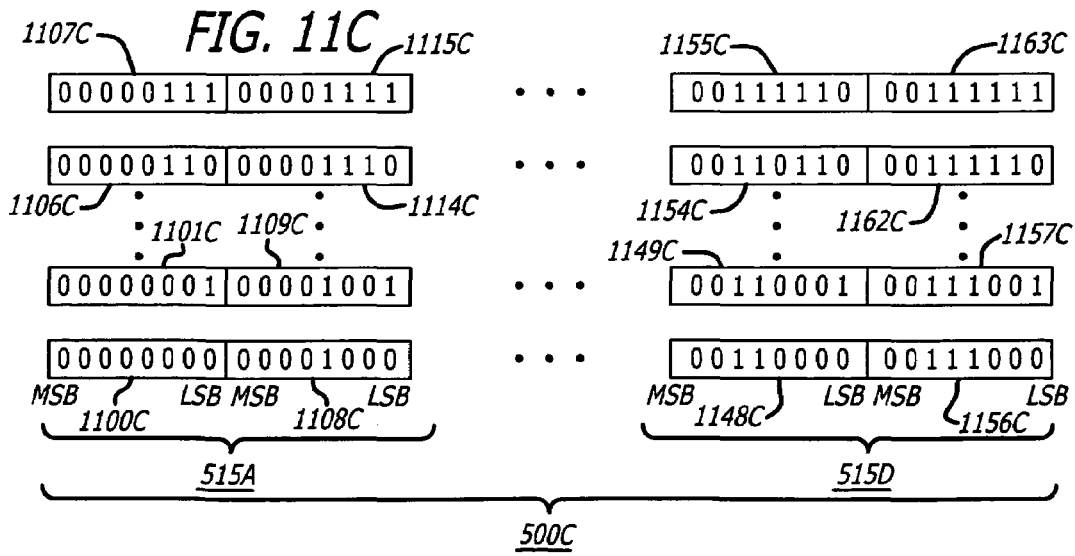

US 7,558,941 B2

AUTOMATIC DETECTION OF MICRO-TILE ENABLED MEMORY

FIELD

Embodiments of the invention relate generally to memory and specifically to the detection of memory modules and memory integrated circuits that support micro-tile memory accesses into memory sub-channels.

BACKROUND INFORMATION

In a memory architecture with a uniform or unified memory access, sometimes referred to as a unified memory architecture (UMA), a processor and a graphic controller share system memory to lower costs. Typically, a UMA memory architecture may be optimized to handle memory requests (read/write accesses) from the processor into the system memory. The typical UMA memory architecture compromises the memory requests made by the graphics controller. Today, graphics performance has become more important to support three dimensions (3D) as well as higher resolution.

In the typical UMA memory architecture, cache memory uses a fixed sixty four (64) byte cache-line to support memory requests made by both the processor and memory requests made by the graphics controller. A typical memory controller in a UMA memory architecture has one or two memory channels. Each memory channel shares all address lines in an address bus with each memory module in order to perform read or write accesses. The data bus in the typical memory channel is typically sixty-four (64) bits wide so that eight (8) bytes of contiguous data for a given address are accessed from memory at the same time. The bits of the data bus may be routed to memory modules in different ways depending upon the type of memory and memory size utilized.

While a processor typically uses all 64 bits of contiguous data accessed from the memory, a graphics controller typically may not. Much of the contiguous data may be discarded when a graphics controller makes a memory request in a UMA memory architecture. Thus, the bandwidth of the memory channel may be inefficiently used by memory requests issued by the graphics controller in the typical UMA memory architecture.

BRIEF DESCRIPTION OF THE DRAWINGS

The features of the embodiments of the invention will become apparent from the following detailed description in which:

FIG. 3A illustrates a high level block diagram of a memory control block coupled to a pair of memory channels each including four memory sub-channels.

FIG. 4A is a diagram illustrating the mapping of pixels on a video display to memory accesses over a memory channel without sub-channels using a linear memory access.

FIG. 4B is a diagram illustrating the mapping of pixels on a video display to memory accesses over a memory channel with two sub-channels supporting a micro-tiling memory access.

FIG. 4C is a diagram illustrating the mapping of pixels on a video display to memory accesses over a memory channel with four sub-channels supporting a micro-tiling memory access.

FIG. 5A is a diagram illustrating a linear sixty-four byte memory access over a sixty four bit wide memory channel.

FIG. 5B is a diagram illustrating independent sub-channel memory access of a pair of thirty-two byte memory accesses over a pair of thirty-two bit wide memory sub-channels.

FIG. 5C is a diagram illustrating independent sub-channel memory access of four sixteen byte memory accesses over four of sixteen bit wide memory sub-channels.

FIG. 6 illustrates an address signal line bit map for a memory channel.

FIG. 11A illustrates an exemplary unique bit sequence in a cache line associated with FIG. 5A.

FIG. 11B illustrates an exemplary unique bit sequence in a cache line associated with FIG. 5B.

FIG. 11C illustrates an exemplary unique bit sequence in a cache line associated with FIG. 5C.

Like reference numbers and designations in the drawings indicate like elements providing similar functionality.

DETAILED DESCRIPTION

Figure 1A:
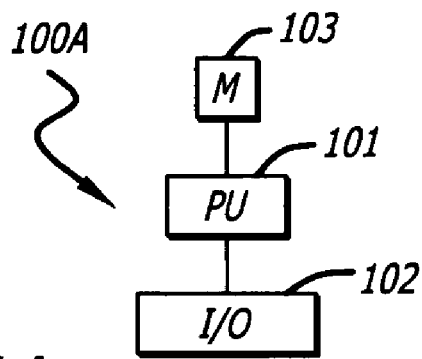
FIG. 1A illustrates a block diagram of a typical computer system in which embodiments of the invention may be utilized.

In the following detailed description of embodiments of the invention, numerous specific details are set forth in order to provide a thorough understanding of the invention. However, it will be obvious to one skilled in the art that the embodiments of the invention may be practiced without these specific details. In other instances well known methods, procedures, components, and circuits have not been described in detail so as not to unnecessarily obscure aspects of the embodiments of the invention.

The memory efficiency of an integrated graphics computer system is typically limited due to the size of a cache-line. Quite often the ideal memory access size for graphics is four to sixteen bytes of data since graphics processors operate on one or a few pixels or texels at a time. However, UMA memory architectures are optimized for a 64 byte cache-line to optimize processor memory efficiency. With a 64 byte cache-line, memory requests by a graphics controller result, on average, in a significant amount of data fetched from memory and never used by the graphics controller. The unused data may be referred to as over-fetch.

With micro-tiling, the over-fetch of memory requests from a graphics controller can be reduced while preserving cache-line requirements in a UMA memory architecture with an integrated graphics controller. Generally, micro-tiling uses a new memory architecture and a new memory controller architecture. To support a micro-tiling memory architecture, the new memory subsystem provides independent sub-channel memory accesses within a memory channel. These independent sub-channel memory accesses into a memory may be referred to as micro-tile or micro-tiled memory accesses and generally referred to as micro-tiling.

While the new memory controller and memory architectures are described, the focus of this application is on the detecting whether or not the memory modules and memory integrated circuits that are plugged into a system support micro-tiling.

The new memory architecture introduces new memory modules and new memory integrated circuits that can support micro-tile memory accesses, including some independent addressability between sub-channels of memory channels. The new memory modules and new memory integrated circuits may be backward compatible, having the same form factor, so that they can also be inserted into older systems without using micro-tiling. In which case, it may be difficult to distinguish between memory modules that are micro-tiled enabled and those that are not. Both micro-tile enabled memory modules and non-micro-tile enabled memory modules can be added to a host printed circuit board and system that supports micro-tiling. If a memory module is plugged into such a system and is non-enabled, that is it doesn't support micro-tiling, that memory channel into which the non-enabled memory module is plugged cannot use micro-tiling. This is so that the micro-tiling memory architecture is backward compatible with the non-micro-tile enabled memory—the memory modules and memory integrated circuits that do not support micro-tiling. Thus to enable micro-tiling in a system, the micro-tile enabled memory modules plugged into a memory channel are automatically detected, as are the memory modules that do not support micro-tiling, if any. This is to be sure that all memory integrated circuits on all the memory modules within a memory channel support micro-tiling prior to using it to read and write data into the memory channel. Thus, this automated check for micro-tiled enabled memory modules and memory integrated circuits is typically performed early during system initialization. The automated check for micro-tiled enabled memory modules and memory integrated circuits during system initialization may be performed directly in hardware or with software assistance such as from the basic input operating system (BIOS) software.

One method to determine whether memory supports micro-tiling is to compare write data and read data with micro-tiling enabled and disabled. In one embodiment of the invention, a unique pattern or value is initially written to a memory location X with micro-tiling disabled. An attempt is then made to enable micro-tiling in each memory module and memory integrated circuit. Then, an attempt to read from memory at the same memory location is made that may actually include reading across memory sub-channels from different memory locations. Then, the write data without micro-tiling enabled is compared with the read data when micro-tiling may have been enabled. If the memory subsystem supports micro-tiling, there should be a difference between the write data and the read data accessed using the same starting address. If micro-tiling is not supported, then the read data is the same as the write data when accessed using the same starting address.

Briefly stated, micro-tiling enables a memory request to be composed of smaller requests for discontiguous sections or chunks of memory. The micro-tiling memory architecture allows read and write memory fetches to vary in size and structure based on the needs of the requestor. In order for the smaller chunks to be correctly identified, additional address information is provided into the system memory by the micro-tiled memory controller. For example, in one embodiment of the invention a sixty-four bit wide memory channel (the physical bit width) may be divided up into four sixteen bit wide sub-channels. In this implementation, a sixty-four byte memory access (the logical byte width of a memory channel) is composed of four discontiguous sixteen byte chunks (assuming that a memory transaction is a burst of 8 transfers). Each sub-channel uses some unique address information. FIG. 3A is an exemplary implementation of four sixteen bit sub-channels, each having some unique address information. Other implementations of a micro-tile memory architecture can vary the size of each sub-channel and the number of independent address lines provided into each sub-channel.

There are several methods available to supply additional independent address information to each sub-channel of the memory array including supplying additional address lines by routing new dedicated lines from the memory controller to the memory integrated devices or re-targeting unused error correction code (ECC) signal lines routed in a memory module to be additional address lines. The independent additional address information may also be supplied by overloading pre-existing address signal lines during typical periods of non-use, such as during a memory cycle when the column addresses are written into memory integrated circuits. In this case, micro-tiling support can be implemented in memory modules and still provide backward compatibility to pre-existing memory module implementations. These methods may be used separately, or in combination in embodiments of the invention to provide the additional address information over a desired number of address lines, including any additional address lines.

In a standard memory channel, such as a memory channel based on double data rate (DDR) DRAM technology, the logical width of the memory channel can be considered to be M bytes wide. There are eight bits in a byte of data. The logical width of the memory channel is somewhat related to the burst length of data transfers over a memory module. That is, M bytes of data can be consecutively accessed by data transfers that form a burst, by using consecutive addresses incremented from a base address. Typically, the base address of the block of bytes to be accessed (read or written) is an integer multiple of the logical width of the channel. The physical width of the memory channel is the bit width of the data bus between the memory controller and the memory modules. The typical minimum burst length may be eight memory cycles with a starting byte order that may be set by the least significant bits of the address lines. With a typical physical width of sixty-four bits, eight memory cycles accesses sixty-four bytes of data in a memory channel. Thus the typical logical width of the memory channel is sixty-four bytes of data.

As discussed previously, the logical width of the memory channel is the number of bytes that can be consecutively transferred with a base address and the physical width of the memory channel is the bit width of the data bus ("$W_{DB}$") between the memory controller and the memory modules. A micro-tiled memory system equally divides the logical width and the physical width of the memory channel into sub-channels having smaller logical byte widths and smaller physical bit widths.

The micro-tiling of memory breaks the physical width of the memory channel ($W_{DB}$ bits) and the logical width of the memory channel (M bytes) into S sub-channels ($W_{SC}$). Each sub-channel has a physical width of $W_{SC}=W_{DB}/S$ bits and a logical width of N=M/S bytes. Thus, N bytes of data may be transferred over $W_{SC}$ bits of data lines in each sub-channel for each burst of data transfers. A memory channel may have a total number of memory locations $T_{ML}$ to access in memory. Each sub-channel accesses a subset of the total memory locations ($T_{SML}$) of a memory channel where $T_{SML}=T_{ML}/S$.

In micro-tiling memory, each sub-channel can access a smaller granularity of data over the memory channel independently from each other. To make them completely independent, separate address signal lines may be routed from the memory controller to each sub-channel. To avoid routing too many separate address signal lines, some address signal lines may be shared across the sub-channels so that memory locations can be independently selected from a set of common addresses. Thus, the address that is presented to each sub-channel has a number of independent address bits ("I") whose value can be different from corresponding bits in the addresses presented to the other sub-channels. Thus, while the data transferred on each sub-channel represents a contiguous block of data, the blocks of data on each sub-channel are not necessarily formed from a contiguous address range. This is because the independent address bits I may be from different bit positions, as is discussed further below.

Figure 1B:
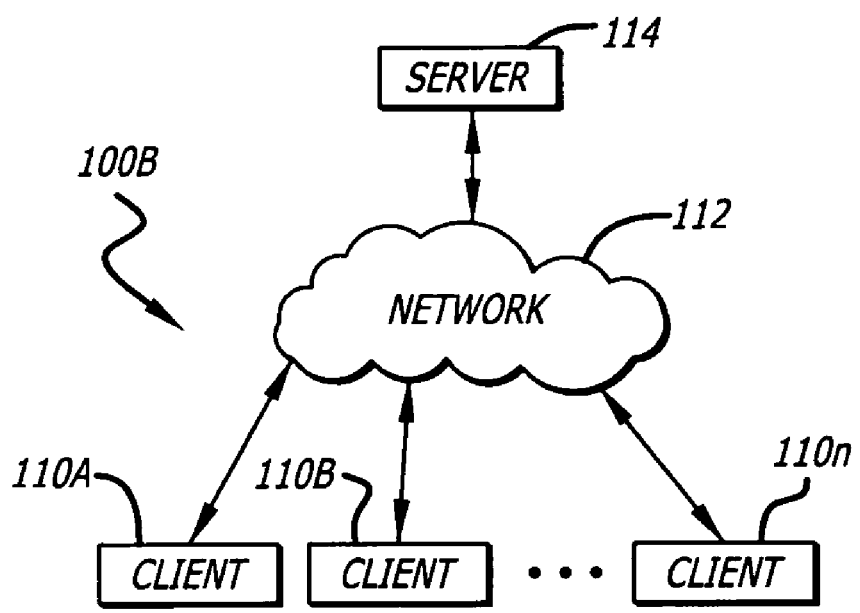
FIG. 1B illustrates a block diagram of a client-server system in which embodiments of the invention may be utilized.

The embodiments of the invention may be used in different systems such as those illustrated in FIGS. 1A-1B. Referring now to FIG. 1A, a block diagram of a typical computer system 100 in which embodiments of the invention may be utilized is illustrated. The computer system 100A includes a processing unit 101; input/output devices (I/O) 102 such as keyboard, modem, printer, external storage devices and the like; and monitoring devices (M) 103, such as a CRT or graphics display. The monitoring devices (M) 103 may provide computer information in a human intelligible format such as visual or audio formats. The system 100 may be a number of different electronic systems other than a computer system.

Figure 2:
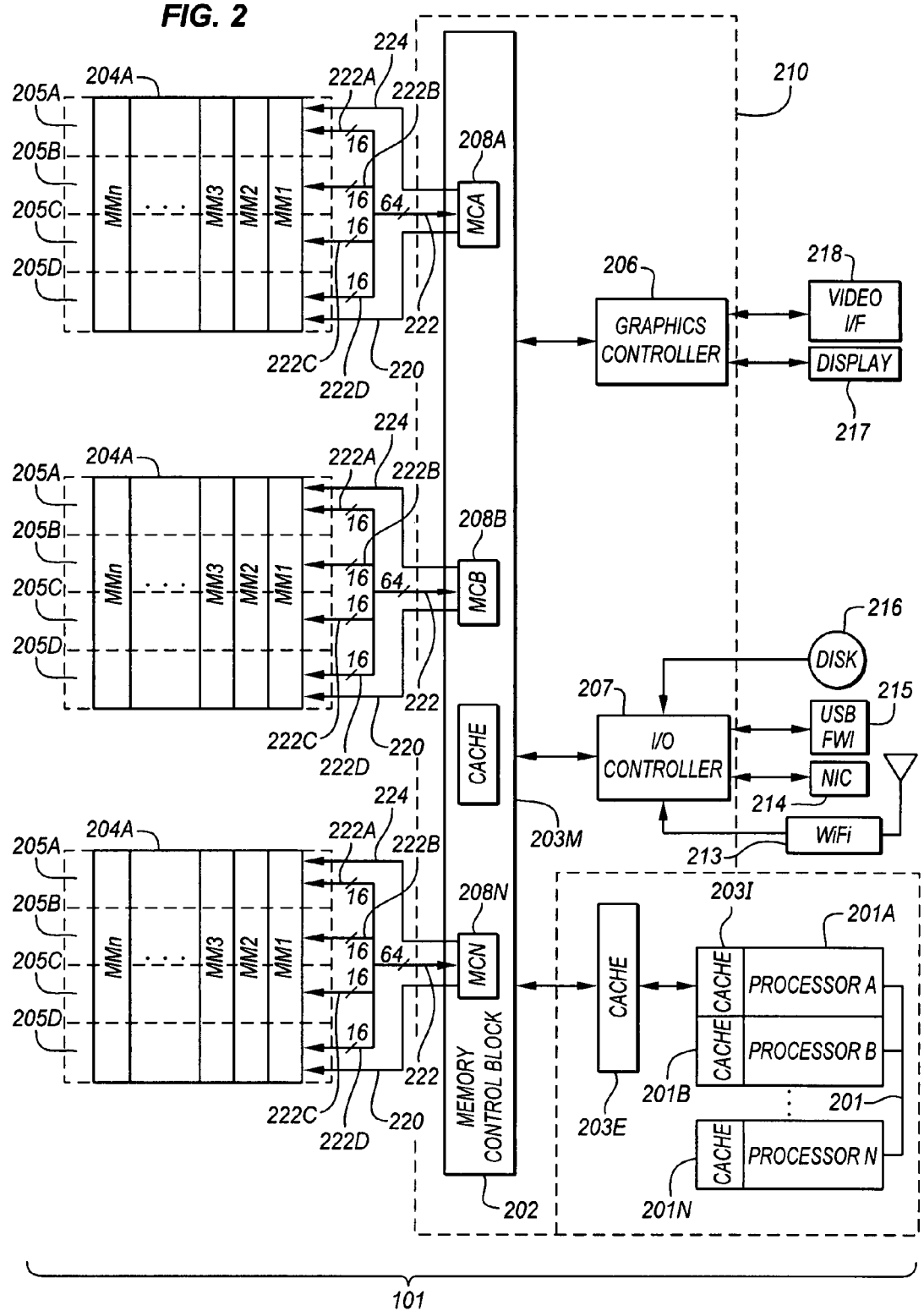
FIG. 2 illustrates a block diagram of a first processing unit in which embodiments of the invention may be utilized.

Referring now to FIG. 1B, a client server system 100B in which embodiments of the invention may be utilized is illustrated. The client server system 100B includes one or more clients 110A-110M coupled to a network 112 and a server 114 coupled to the network 112. The clients 110A-110n communicate with the server 114 through the network 112 in order to transmit or receive information and gain access to any database and/or application software that may be needed on the server. The clients 110A-110n and the server 114 may be instances of the typical computer system iGGA. The server 114 has a processing unit with memory and may further include one or more disk drive storage devices. The server 114 may be used in a storage area network (SAN) as a network attached storage (NAS) device, for example, and have an array of disks. The data access to the server 114 may be shared over the network 112 with the multiple clients 110A-110n. Referring now to FIG. 2, a detailed block diagram of a processing unit 101 in which embodiments of the invention may be utilized is illustrated. The processing unit 101 may include a processor circuit 201, a memory control block 202, external cache memory 203E, one or more memory channels 204A-204N, a graphics controller 206, and an input/output controller 207 coupled together as shown. A combination of two or more elements of the processor circuit 201, the memory control block 202, the cache memory 203E, the graphics controller 206, and the input/output controller 207 of the processing unit 101 may be integrated together into a single integrated circuit. For example, the memory control block 202, the graphics controller 206, and the input/output controller 207 may be integrated together as an integrated circuit 210. As another example, the processor circuit 201, the memory control block 202, the cache memory 203E, the graphics controller 206, and the input/output controller 207 may be integrated together as an integrated circuit 210. As another example, the memory control block 202 with its memory controller may be integrated into the processor circuit 201. While the external cache memory 203E coupled between the processor circuit 201 and the memory control block 202 is illustrated as being part of the integrated circuit 210, it may be a separate circuit. Oftentimes, the cache memory 203E remains external to the integrated circuit 210' as it is more efficient to manufacture large memory capacities separately.

The processor circuit 201 may include one or more execution units or more than one processor (also referred to as core processors), such as processors A-N 201A-201N, as a multi-processor integrated circuit. Each processor of the processor circuit 201 may have one or more levels of an on-chip or internal cache memory 203I or share the same internal cache memory. Other levels of cache memory may be external to the processor 201 and interface to the memory controller, such as external cache memory 203E. The processor circuit 201 may also have an on-chip or internal random access memory (RAM) and an on-chip or internal read only memory (ROM) as a microcomputer may have. The processor 201, its one or more execution units, and the one or more levels of cache memory may read or write data (including instructions) through the memory control block 202 with the one or more memory channels 204A-204N.

The memory control block 202, coupled to and between the one or more memory channels 204A-204N and the processor 201 as well as the graphics controller 206, may optionally have its own internal cache memory 203M or it may be external as another level of cache memory. The memory control block 202 includes one or more micro-tile memory controllers MCA-MCN 208A-208N for each of the respective one or more memory channels 204A-204N.

Each of the one or more memory channels 204A-204N includes one or more memory modules MM1-MMn. Each memory module includes one or more memory integrated circuits or devices. The one or more memory integrated circuits or devices may be various types of memory integrated circuits including dynamic random access memory (DRAM) circuits, static random access memory (SRAM) circuits, or nonvolatile random access memory (NVRAM) circuits. However, in the preferred embodiment of the invention, the one or more memory integrated circuits are dynamic random access memory (DRAM) circuits.

Each of the one or more memory channels 204A-204N includes two or more memory sub-channels. In FIG. 2, four memory sub-channels 205A-205D are included in each memory channel 204A-204N. While four memory sub-channels are illustrated in each memory channel it is understood that other divisions of a memory channel may be had including even or odd numbers of sub-channels, such as two memory sub-channels. The divisions of a memory channel may change as the logical width or burst lengths of a memory channel increases.

The one or more memory modules MM1-MMN in each memory channel 204A-204N may be configured to support micro-tiling. An algorithm may be used by the memory control block to determine whether or not the one or more memory modules support micro-tiling. The one or more memory circuits or devices included on the one or more memory modules may be configured to support micro-tiling. The one or more memory circuits can be micro-tiled enabled (MTE) and assigned to support a specific memory sub-channel. The one or more memory circuits may include additional pins or have additional bits in a mode register to be micro-tiled enabled and assigned to a specific memory sub-channel. In the case of additional pins being provided by the memory circuits, external jumper pins, jumper wires, or micro-switches (for example, DIP switches) may be used to configure micro-tiling support. In the case of the mode register being provided in the memory circuits, the independent portion of the data bus into each sub-channel may be used to load the mode register with an appropriate loading strobe.

The I/O controller 207 may be coupled to the memory control block 202 to write data into the one or more memory channels 204A-204N so it is accessible by the processor 201. The processing unit 101 may further include a wireless network interface circuit (WNIC) 213, a wired network interface circuit or card (NIC) 214, a universal serial bus (USB) and/or firewire (FW) serial interface 215, and/or a disk drive 216 coupled to the I/O controller 207. The wireless network interface circuit (WNIC) 213 provides a radio connection to a base radio unit such as through a wireless local area networking, wifi (IEEE 802.11), Bluetooth, or other radio connection. The wireless networking interconnection (WNIC) 213 includes an antenna to couple by radio waves to a base radio unit or other mobile radio unit. The NIC 214 provides an Ethernet wired local area network connection. The USB/FW serial interface 215 allows for expansion of the system to include other I/O peripheral devices. The disk drive 216 is well known and provides rewriteable storage for the processor 201. The disk storage device 216 may be one or more of a floppy disk, zip disk, DVD disk, hard disk, rewritable optical disk, flash memory or other non-volatile storage device.

The graphics controller 206 is coupled to the memory control block 202 to read and write data into the one or more memory channels 204A-204N. The processor 201 may write data into the one or more memory channels 204A-204N so that it is accessible by the graphics controller 206 and displayable on a graphics display or video device. A graphics display 217 may be coupled to the graphics controller 206. A video interface 218 may couple to the graphics controller 206. The video interface 218 may be an analog and/or digital video interface.

In the processing unit 101, the processor 201, the I/O controller 207, and the graphics controller 206 may access data in the one or more memory channels 204A-204N through memory controllers in the memory control block 202. The memory controllers in the memory control block interface to a respective memory channel 204A-240N to read and write data between the system memory and the processor 201, the I/O controller 207, and the graphics controller 206. In interfacing the micro-tiled memory controllers 208A-208N to the memory channels 204A-204N, respectively, there may be address signal lines 220 of an address bus, data signal lines 222 of a data bus, and control and clocking signal lines 224 as part of the memory interface. The input devices coupled to the I/O controller 207, such as the disk storage device 216, may also read and write information into the system memory.

Generally, the data signal lines 222 of the data bus are divided out into the S sub-channels. In FIG. 2, where S is four, the data signal lines 222 of the data bus are divided out into four sub-channels as illustrated by the sub-channel data lines 222A, 222B, 222C, and 222D and coupled into the respective sub-channels 205A, 205B, 205C, and 205D. For example, a sixty four-bit bus is divided into four sets of sixteen bit data lines. Some of the address signal lines 220 may be shared into the sub-channels while other address signal lines are independent from one sub-channel to the next, in one embodiment of the invention. In another embodiment of the invention, the address signal lines 220 may be fully independent into each sub-channel. The address signal lines are further described below.

Referring now to FIG. 3A, a block diagram of a two memory channels is illustrated. FIG. 3A illustrates a combined graphics and memory controller 300, also referred to as a host 300, coupled to a memory channel 0 305[4]A and a memory channel 1 304B. Memory channel 0 30[4]A and memory channel 1 305[4]B are each divided into four sub-channels 305A, 305B, 305C, and 305D. Each memory channel has an independent micro-tile memory controller to support the sub-channels of the memory channel. Each memory channel has an independent data bus. For example assuming a total data bit width of 64 bits for each data bus of the memory channels, each sub-channel is coupled to an independent set of 16 bits of the data bus. Sub-channel 305A is coupled to data bits D15-D0, sub-channel 305B is coupled to data bits D31-D16, sub-channel 305C is coupled to D47-D32, and sub-channel 305D is coupled to data bits D63-D48 as is illustrated in FIG. 3A.

As previously discussed, some address signal lines may be shared into each of the sub-channels while other address signal lines are independent from one sub-channel to the next, in one embodiment of the invention. For example, address signal lines 310 (labeled Axx-A10, BA2-BA0) are shared to all sub-channels 305A-305D. That is, each of the address signal lines 310 may be fanned out and coupled into each sub-channel. In contrast, address signal lines 311A (first set labeled A10[9]-A6) are independently coupled into sub-channel 305A. Address signal lines 311B (second set labeled A10[9]-A6) are independently coupled into sub-channel 305B. Address signal lines 311C (third set labeled A10[9]-A6) are independently coupled into sub-channel 305C. Address signal lines 311D (fourth set labeled A10[9]-A6) are independently coupled into sub-channel 305D.

Ideally, enough independent address lines are provided to allow full addressability within the allocated memory page size granularity. The page size is typically set by software managing the graphic memory space. For example consider the case of a 4 kilo-byte (KB) page size allocation in a two-channel cache-line interleaved memory subsystem. 2 KB of the page are mapped to each memory channel. In which case, five address lines may be used to address thirty-two 64B cache lines in each physical page of memory. Thus, fifteen additional independent address lines would be ideal for a four sixteen bit sub-channel implementation. These are shown as address signal lines 311B-D respectively labeled as the second, third, and fourth sets of address lines labeled A10-A6 over the original first set of address signal lines 311A labeled as the first set of address lines A10-A6. If fewer additional independent address lines are made available, the independent address space addressable by each sub-channel is reduced. If more independent address lines are made available into each sub-channel, the independent address space addressable by each sub-channel is increased. To implement two thirty-two bit sub-channels, it is desirable to have five additional independent address lines.

Extra address signal lines may be routed between the memory controller and the sub-channels to provide the independent address signal lines as illustrated in FIG. 3A. Address signals may be overloaded onto the pre-existing address lines.

A combination of routing extra address signal lines and overloading of address signals may be used to support micro-tiling. Alternatively, each sub channel may be provided with a complete set of independent address lines without the shared address lines 310 illustrated in FIG. 3A. However, using the shared address signal lines 310 conserves printed circuit board area by avoiding the routing of independent address signal lines.

Referring momentarily to FIG. 6, an address signal line bit map for a memory channel is illustrated using shared and independent address bits. That is, FIG. 6 is an address bit map that illustrates the interpretation of the address bits in a physical address. A set of I independent address bits (IAB) is provided to each sub-channel to support micro-tiling. A set of zero or more SA shared address bits (SAB) may be provided to all of the sub-channels. A set of Q sub-channel select bits (SSB) are used in the assignment of a memory request to a sub-channel. A set of P sub-channel data address bits (SDAB) are used to address the bytes in each cache-line within a DRAM memory. The set of P SDAB bits are typically the least significant bits of the address signal line map. The set of Q SSB bits and the P SDAB bits are not actually routed between the memory controller and the sub-channel memory, it being understood that the base address of the block of data being accessed is an integer multiple of the burst size. That is, the P SDAB bits may be generated internally by a memory integrated circuit such as by a DRAM device in accordance with double data rate (DDR) memory specifications. While FIG. 6 illustrates certain address bits being chosen to be shared and independent address bits, other address bits may be assigned instead. That is, the division of the address bits above the P sub-channel data address (SDAB) bits into the SA shared address (SAB) bits and the I independent address (IAB) bits in general is arbitrary.

Referring now to FIGS. 4A-4C, idealized pixel map renderings of a triangle are illustrated using a tiled address space. FIG. 4A illustrates the rasterization of the triangle 401 in a tiled address space using a non-micro-tiled memory system in which the logical channel width is 64 bytes. FIGS. 4B-4C illustrate the rasterization of the triangle 401 in a tiled address space using a micro-tiled memory system. The unit of rasterization of the triangle 401 is a fragment 402. A fragment 402 may represent a pixel or a texel. A tiled address space is one in which a logically two-dimensional array of data is organized as a set of sub-arrays, such that the data within the subarray is stored in a contiguous range of the address space and are thus highly localized in memory. A logically two-dimensional array of data that is linearly addressed has no such sub-arrays; instead, data such as fragments 402 are addressed linearly across from left to right in a row and then down to the next row from top to bottom. Thus, vertically adjacent fragments 402 may be far apart in memory.

In comparison with FIG. 4A, FIGS. 4B-4C show how micro-tile memory accesses provide the advantages of smaller memory requests. Each of FIGS. 4A-4C show the rasterization of a triangle 401 for a different memory request size.

In FIG. 4A, a single memory request encompasses the data representing 16 fragments. Each of the individual squares 402 represents a fragment, typically thirty-two bits or four bytes of data per fragment. FIGS. 4A-4C illustrate a 20×20 array of fragments. A 4×4 array of fragments, as illustrated in FIG. 4A, is a span 404 and represents a sixty-four byte memory request. A subspan 424 is illustrated in FIG. 4C as a 2×2 array of fragments or a sixteen byte memory request. A double subspan 414 is illustrated in FIG. 4B and is a 32 byte memory request that is oriented as a 2×4 array of fragments.

The differences between FIGS. 4A-4C illustrate the theoretical reduction in over-fetch as the memory request size decreases. In each of the FIGS. 4A-4C, the triangle 401 requires access of the same number of fragments. However a memory access typically transfers the data of more than one fragment, such that it may include data representing fragments 408 within the triangle 401 and fragments 406 outside the triangle 401. Data representing fragments 406 outside of the triangle 401 are over-fetched, resulting in the inefficient use of the memory bandwidth.

In FIG. 4A, a 64 byte memory access transfers the data of a span 404, a 4×4 block of fragments. For example, span 404A is a first 64 byte memory access. Span 404B is a second 64 byte memory access. For example consider that the triangle 401 encompasses approximately fifty-seven pixels to render. For the 64 byte memory access case, ten memory accesses are needed to access the 65 fragments within the triangle. Data of an additional 95 fragments is accessed but might not be used.

In FIG. 4B, a 32 byte memory access transfers the data of a double sub-span, a 2×4 block of fragments or one-half of a 64 byte memory access. For example, double subspan 414A is a first 32 byte memory access. Double subspan 414B is a second 32 byte memory access. For the 32 byte memory access case, thirteen memory accesses are needed to access the 65 fragments within the triangle. Data of an additional 47 fragments is accessed but might not be used.

In FIG. 4C, a 16 byte memory access transfers the data of a sub-span, a 2×2 block of fragments or one-quarter of a 64 byte memory access. A span 424A is a first 16 byte memory access. A span 424B is a second 16 byte memory access. A span 424C is a third 16 byte memory access. A span 424D is a fourth 16 byte memory access. For the 16 byte memory access case, twenty-two memory accesses are needed to access the 65 fragments within the triangle. Data of an additional 13 fragments is accessed but might not be used.

Consider as another example that the triangle 401 requires sixty-five pixels or fragments (260 bytes) to display in each of FIGS. 4A, 4B and 4C. In FIG. 4A, approximately ten spans of memory are accessed including one-hundred sixty pixels or six-hundred forty bytes of data to render triangle 401. In FIG. 4B, approximately thirteen double subspans of data are accessed including one-hundred twelve pixels or four-hundred forty-eight bytes of data to render triangle 401. In FIG. 4C, approximately twenty-two subspans of data are accessed including eighty-eight fragments or three-hundred fifty-two bytes of data to render triangle 401. Thus in comparison with FIG. 4A, the over-fetched pixels or fragments 406 are reduced in FIGS. 4B and 4C by implementing micro-tile addressing with sub-channels within each memory channel.

As previously discussed, FIGS. 4B-4C illustrate the rasterization of the triangle 401 in a tiled address space using a micro-tiled memory system that includes memory sub-channels. In FIG. 4B, a 64 byte wide memory channel may be formed from two 32 byte wide memory sub-channels. In this case, a micro-tiled memory access combines two discontiguous 32 byte accesses into a single 64 byte access, one on each of the two sub-channels for a total size of 64 bytes. Rasterization of the triangle results in requests to access double subspans 414. For example, the micro-tile memory controller may combine requests to access double subspans 414C and 414D into a single micro-tiled memory access. As another example, the memory controller may combine requests to access double subspans 414E and 414F into a single micro-tiled memory request. Other combinations of requests to access double subspans may be formed into a single micro-tiled memory request or access. In one or more embodiments of the invention, the combined sub-channel accesses have a shared address bit pattern in the SA shared address bits.

In FIG. 4C, a 64 byte wide memory channel may be formed from four 16 byte wide memory sub-channels. In this case, a micro-tiled memory access combines four discontiguous 16 byte accesses into a single 64 byte access, one on each of the four sub-channels for a total size of 64 bytes. Rasterization of the triangle results in requests to access subspans 424. For example, the micro-tiling memory controller may combine requests to access subspans 424E, 424F, 424G, and 424H into a single micro-tiled memory access. Other combinations of requests to access subspans may be formed into a single micro-tiled memory request or access. In one or more embodiments of the invention, the combined sub-channel memory accesses have a shared address bit pattern in the SA shared address bits for each of the four memory sub-channels.

In the ideal case, it is assumed that all micro-tiled memory requests can be utilized by the micro-tile transaction assembler to build 64B memory transactions with no unused sub-channels. That is, the effectiveness of micro-tiling depends on the ability of the transaction assembler 326A,326B to construct fully populated memory transactions.

Figure 3B:
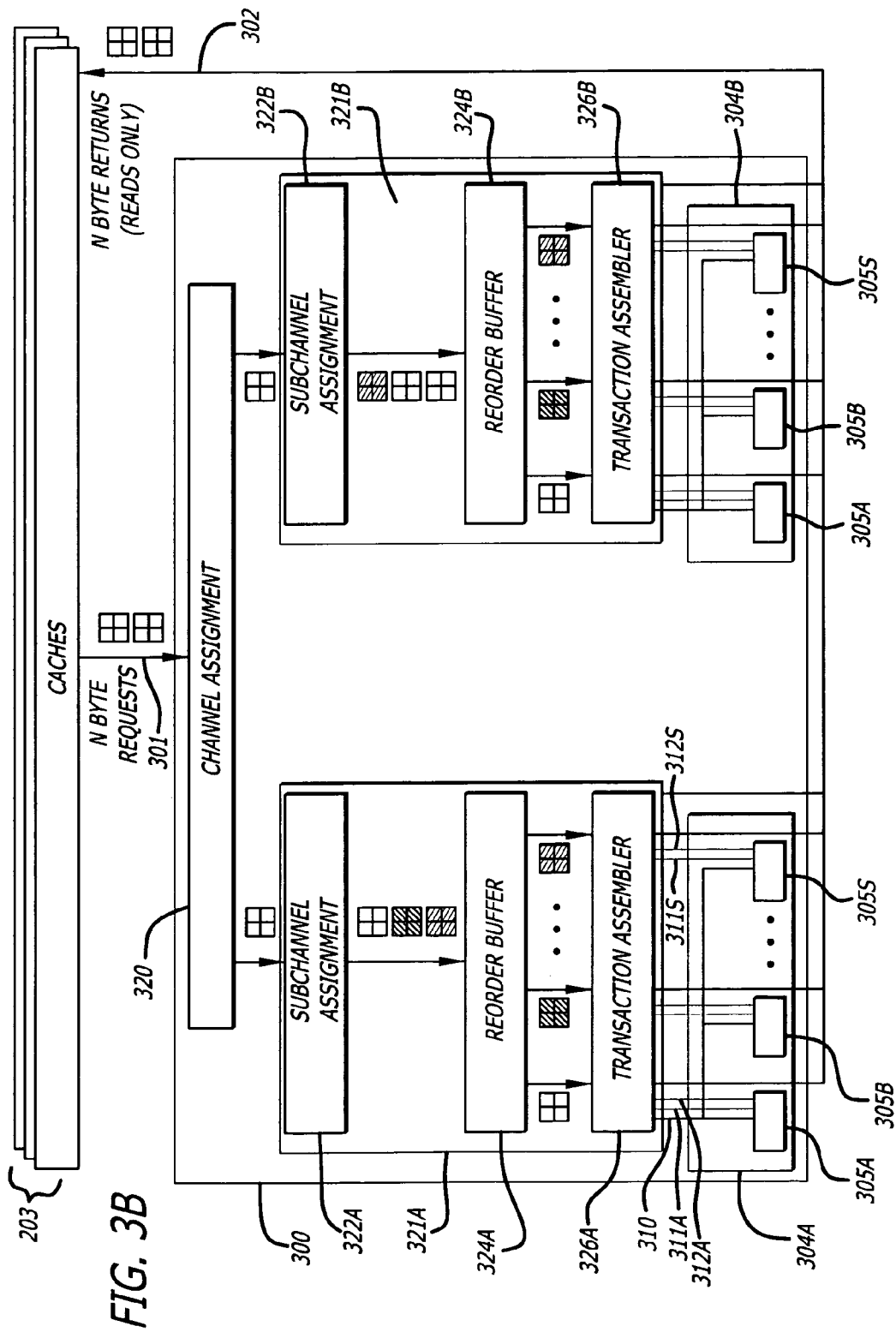
FIG. 3B illustrates a detailed block diagram of memory controllers in a memory control block coupled to cache memory and a pair of memory channels including a plurality of S sub-channels.

Referring now to FIG. 3B, a multi-channel memory subsystem is illustrated including a micro tiled memory control block 300 coupled to the system memory channels and one or more cache memory 203. Within the memory control block 300, the multi-channel memory subsystem includes a micro-tiling memory controller for each memory channel into system memory.

In FIG. 3B, two memory channels 304A and 304B are provided. Thus, two micro-tile memory controllers 321A and 321B are provided for the respective memory channels 304A and 304B. Each memory channel 304A,304B may be composed of S sub-channels 305A-305S. Each sub-channel 305 is logically N bytes wide and B bits wide. Each memory channel 304 is logically M=N*S bytes wide.

Between the memory control block 300 and the cache memory 203 is a write data path 301 and a read data path 302 that can include command paths or address paths over which read and write requests can be made. N bytes are returned to the cache 203 from the memory control block 300 over the read data path 302 in the case of a read transaction. An N byte write request is provided from the cache 203 to the memory control block 300 over the write data path 301 in the case of a write transaction. While an N byte read or write request is made between the cache 203 and the memory control block 300, requests are depicted as arrays of 2×2 tiles to represent a 2×2 array of pixels or texels, such as my be used with four sub-channels.

The memory control block 300 includes a channel assignor 320, a first memory controller 321A, and a second memory controller 321B. The memory control block 300 is also coupled to memory channel zero 304A and memory channel one 304B. Memory channel zero 304A includes "S" sub-channels 305A-305S. Similarly, memory channel one 304B includes "S" sub-channels 305A-305S. Shared address lines 310 couple from each memory controller 322 into each sub-channel 305A-305S. Independent address lines 311A-311S couple into the respective sub-channels 305A-305S. Each of the data bus sub-channel portions 312A-312S is coupled into the respective memory sub-channels 305A-305S.

Each of the memory controllers 321A and 321B include a sub-channel assignor 322A-322B, a reorder buffer 324A-324B, and a transaction assembler 326A-326B respectively.

The memory request for N bytes of data, the logical width of a channel, is coupled into the channel assignor 320. The channel assignor assigns the memory request to either of memory channel 0 304A or memory channel 1 304B depending upon the circumstances including the variability of the memory channel. After being assigned to a memory channel by the channel assignor, the N byte request is coupled into the respective memory controller 321A or 321B and into the sub-channel assignor 322A or 322B.

The sub-channel assignor 322A and 322B assigns the N byte requests to one of the sub-channels 305A-305S. Referring momentarily to FIG. 6, the Identity Sub-channel Assignment, s, may be defined by the following process: (1) The request address, "A", is shifted right by the P SDAB bits, resulting in a new integer value Ã (where, Ã=A>>P). (2) The value "s" for the Sub-channel Assignment is the least significant Q SSB bits of A (e.g., s=Ã& ((1<<Q)−1)).

Each of the micro-tiling memory controllers 321A-321B has a reorder buffer 324A-324B, respectively. The reorder buffer reorders the memory request into the sub-channels so as to increase the bandwidth efficiency in each memory channel. A request to read or write a block of N bytes of data at address "A" enters the memory controller 322A or 322B, is assigned to a sub-channel, and is placed in the reorder buffer. The reorder buffer may be implemented as a reorder queue for each sub-channel. Other implementations of the reorder buffer are possible.

The transaction assembler 326A,326B forms a memory read transaction by selecting S read requests, one for each sub-channel, from the reorder buffer, such that all S requests have the same shared address bits. It forms a memory write transaction by selecting S write requests, one for each sub-channel, from reorder buffer, such that all S requests have the same shared address bits. For example, the transaction assembler 326A,326B may assemble a 64 byte transaction in a memory channel from four 16 byte requests, one to each sub-channel.

When attempting to form a transaction, the transaction assembler in a micro-tiled controller may not be able to find a concurrent set of requests, one for each sub-channel, such that the SA shared address bits are the same across all sub-channels. In such a case, no data may be transferred on a sub-channel for which a request was not found, or if data is transferred over that sub-channel, the data can be discarded.

Referring now to FIGS. 5A-5C, exemplary byte ordering is illustrated for each memory channel 500A-500C. In FIG. 5A, memory channel 500A has a transfer size of 64 bytes numbering from 0 to 63. The logical width of 64 bytes may be accessed by a 64 bit physical width of memory channel.

In FIG. 5B, memory channel 500B may be divided into two memory sub-channels 505A and 505B, each of which transfers one-half of a 64 byte transfer, so that each sub-channel transfers 32 bytes. For memory sub-channel 505A, the memory bytes are that are accesses number from 0 to 31, reordered from that of FIG. 5A. For memory sub-channel 505B, the bytes that are accessed are numbered from 32 through 63, reordered from that of FIG. 5A.

In FIG. 5C, the memory channel 500C may be divided into four memory sub-channels, 515A, 515B, 515C, and 515D, each of which transfers one-fourth of a 64 byte transfer, so that each sub-channel transfers 16 bytes. Memory sub-channel 515A accesses memory bytes numbering from the 0 to 15, reordered from that of FIG. 5A. Memory sub-channel 515B accesses memory bytes 16 through 31, reordered from that of FIG. 5A. Memory sub-channel 515C accesses byte numbers 32-47, reordered from that of FIG. 5A. Memory sub-channel 515D accesses byte numbering 48-63, reordered from that of FIG. 5A. In this manner, a 64 byte transfer is equally distributed across each of the memory sub-channels while the byte numbers are reordered and assigned.

Referring now back to FIG. 6, the bytes may be reordered differently in other embodiments of the invention.

As discussed previously, to support micro tile memory access, SA shared address bits may be utilized along with I independent address bits while the Q sub-channel select bits and P sub-channel data address bits are utilized to address the physical bytes accessed by a cache-line. For a 64 byte cache-line, the sum of Q sub-channel select bits and P sub-channel data address bits is 6.

In FIG. 6, we indicate the P sub-channel data address bits as being A0-A8. On FIG. 6, the Q sub-channel select bits are labeled A10, A8 and any more there in between. In FIG. 6, the I independent address bits are labeled A9, A10, A16, A18, A24 and any more there in between. In FIG. 6, the SA shared address bits are labeled as A11, A15, A17, A19, A20, A25, A26, and Ax for example. Additional shared address bits may be used in between.

With the I independent address bits, the sub-channel addresses are independent within an address offset of each other. To make the sub-channels fully independent from each other, a complete duplication of the command and address from the memory controller to each sub-channel may be used but would significantly increase the memory controller pin count, the silicon area for input/output drivers, and the wire routing area needed over a host printed circuit board or motherboard. Instead, embodiments of the invention share one or more portions of the sub-channel address bits across all sub-channels and permit the remainder, I, to be independent for each sub-channel, as depicted in FIG. 6. A judicious choice of the I independent address bits can therefore provide increased bandwidth efficiency, balanced against the cost of duplicating I address signals to each sub-channel.

As discussed previously, the I independent address bits may be obtained in different manners including routing additional address lines to each memory sub-channel and/or using address overloading.

Figure 7:
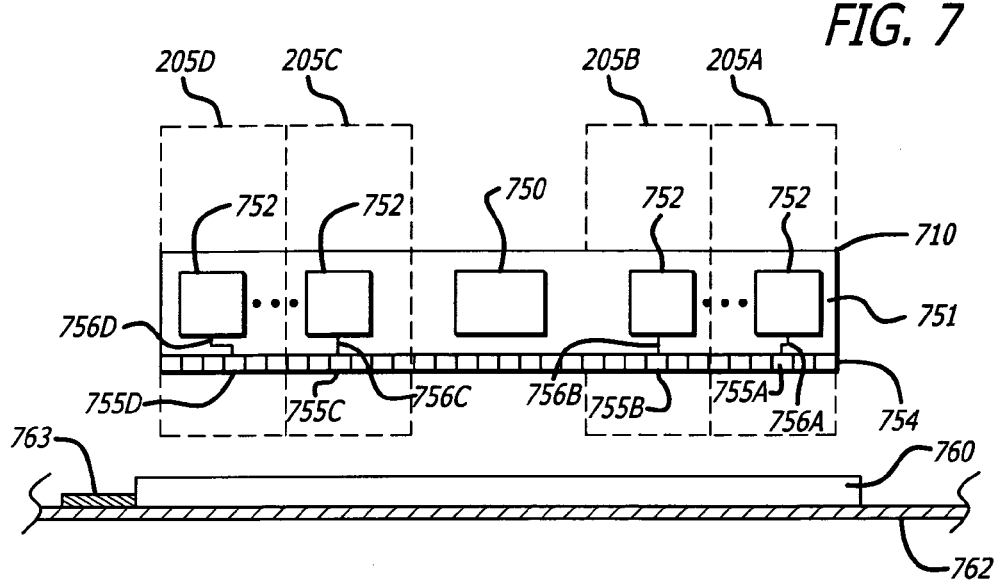
FIG. 7 illustrates a block diagram of a multi-chip memory module to couple to a connector mounted on a host printed circuit board.

Referring now to FIG. 7, a memory module (MM) 710 is illustrated that is exemplary of the memory modules MM1-MMn. The memory module 710 may be of any type such as a single inline memory module (SIMM) or a dual inline memory module (DIMM), for example. The memory module 710 includes memory integrated circuit chips ("memory devices") 752 coupled to a printed circuit board 751. The printed circuit board 751 includes an edge connector or edge connection 754 that couples to an edge connector 760 of a host printed circuit board 762.

The memory modules 710 support micro-tiling and micro-tile memory accesses. However, other pre-existing memory modules will not support micro-tiling and micro-tile memory accesses. The pre-existing memory modules that do not support micro-tiling and micro-tile memory accesses may be plugged into one edge connector 760 of the host printed circuit board 762 while the memory modules 710 that support micro-tiling and micro-tile memory accesses are plugged into other edge connectors 760 of the host printed circuit board 762. In this manner, the memory modules that support micro-tiling may be mixed up in a system with memory modules that do not support micro-tiling.

To support micro-tiling of memory, additional address signal lines may be independently supplied to the memory integrated circuits 752 by using the unused or no-connect pins of the pinout of the edge connection 754 of the printed circuit board 751, in one embodiment of the invention. These unused or no-connect pins of the edge connection 754 may be used to route additional independent address signal lines to the memory integrated circuits 752. The same unused pins are found in the corresponding edge connector 760 mounted to the motherboard 762. Additional independent address signal lines 763 are routed across the motherboard 762 to the pre-existing connector from the memory controller in the memory control block to supply the additional independent address information. A number of different types of unused or no-connect pins of the pinout of the edge connection 754 of the memory module may be found.

For example, parity or an error correction code (ECC) function may have pins reserved as part of the pin-out for the edge connection 754. To lower the costs of memory modules to consumers, parity and ECC functions are often left off the memory module so that the reserved signal lines and pins often go unused. That is, the parity/ECC signal lines may be routed into all edge connectors of the motherboard, but are only used when ECC enabled memory modules (e.g., dual inline memory modules (DIMMs)) are installed therein. The unused pre-existing ECC lines/pins of the memory module are retargeted as independent address signal lines and used to implement micro-tiling in non-ECC memory modules. However in using the ECC lines/pins for micro-tiling, both ECC and micro-tiling functions cannot be enabled at the same time on a memory module. This solution works well in environments that don't typically need (or want) parity/ECC to be enabled.

As another example, optional active low data signal lines that are reserved in the pin-out for the edge connection 754 often go unused as they are redundant of the active high signal lines which are provided. As yet another example, optional test pins reserved within a pin-out for the edge connection 754 of the memory module often go unused as that test mode may not be used.

In any case, these unused pins are retargeted to be independent address signal pins 755A-755D and independent address signal lines 763 are routed on the host printed circuit board 762 and independent address signal lines 756A-756D are routed on the PCB 751 of the memory module 710 to the memory integrated circuits 752.

In some cases, the memory module 710 may further include a support integrated circuit 750 such as a buffer integrated circuit ("buffer") or an error correction control (ECC) integrated circuit. However as discussed previously, if ECC is not provided on the memory module 710, pins of the edge connection 754 that would have been otherwise reserved for ECC and are unused may be used for independent address lines into a memory sub-channel to support micro-tiling.

To support micro-tiling and independent addressing of memory sub-channels, the memory integrated circuits 752 on the memory model 710 may be divided up and assigned to the different memory sub-channels, such as the four memory sub-channels 205A, 205B, 205C, and 205D as illustrated in FIG. 7. The data I/O of a memory integrated circuit 752 is typically 4, 8 or 16 bits wide. For a physical width of sixty-four bits for a memory channel and sixteen bits for each memory sub-channel, four sixteen bit wide memory integrated circuits 752 would be respectively assigned one-to-one to the four memory sub-channels 205A, 205B, 205C, and 205D. Eight eight-bit wide memory integrated circuits 752 would be respectively assigned two at a time to the four memory sub-channels 205A, 205B, 205C, and 205D to provide a physical width of sixty-four bits for a memory channel and sixteen bits each memory sub-channel. Sixteen four-bit wide memory integrated circuits 752 would be respectively assigned four at a time to the four memory sub-channels 205A, 205B, 205C, and 205D to provide a physical width of sixty-four bits for a memory channel and sixteen bits each memory sub-channel.

In the case of two memory sub-channels, four sixteen bit wide memory integrated circuits 752 would be respectively assigned two at a time to the two memory sub-channels for a physical width of sixty-four bits for a memory channel and thirty-two bits for each memory sub-channel. Eight eight-bit wide memory integrated circuits 752 would be respectively assigned four at a time to the two memory sub-channels for a physical width of sixty-four bits for a memory channel and thirty-two bits for each memory sub-channel. Sixteen four-bit wide memory integrated circuits 752 would be respectively assigned eight at a time to the two memory sub-channels for a physical width of sixty-four bits for a memory channel and thirty-two bits for each memory sub-channel.

By using the unused pins of the edge connection 754 of the memory module and a standard edge connector 760, the memory module 710 can be backward compatible with pre-existing memory subsystems.

Consider FIG. 3A for example where four independent memory sub-channels are found in each memory channel. An additional independent four address lines may be provided per sub-channel to independently access an area of memory in each sub-channel. Address lines 311A-311D (labeled A9-A6) are independent within each sub-channel. Given that one set of four address lines pre-exists, the total number of additional address lines that are to be routed is three time four or twelve independent address signal lines. Routing additional signal lines over a motherboard to a memory module may be used to add the independent address signaling when the pinout of a pre-existing edge connector and memory module is not fully utilized.

Figure 8:
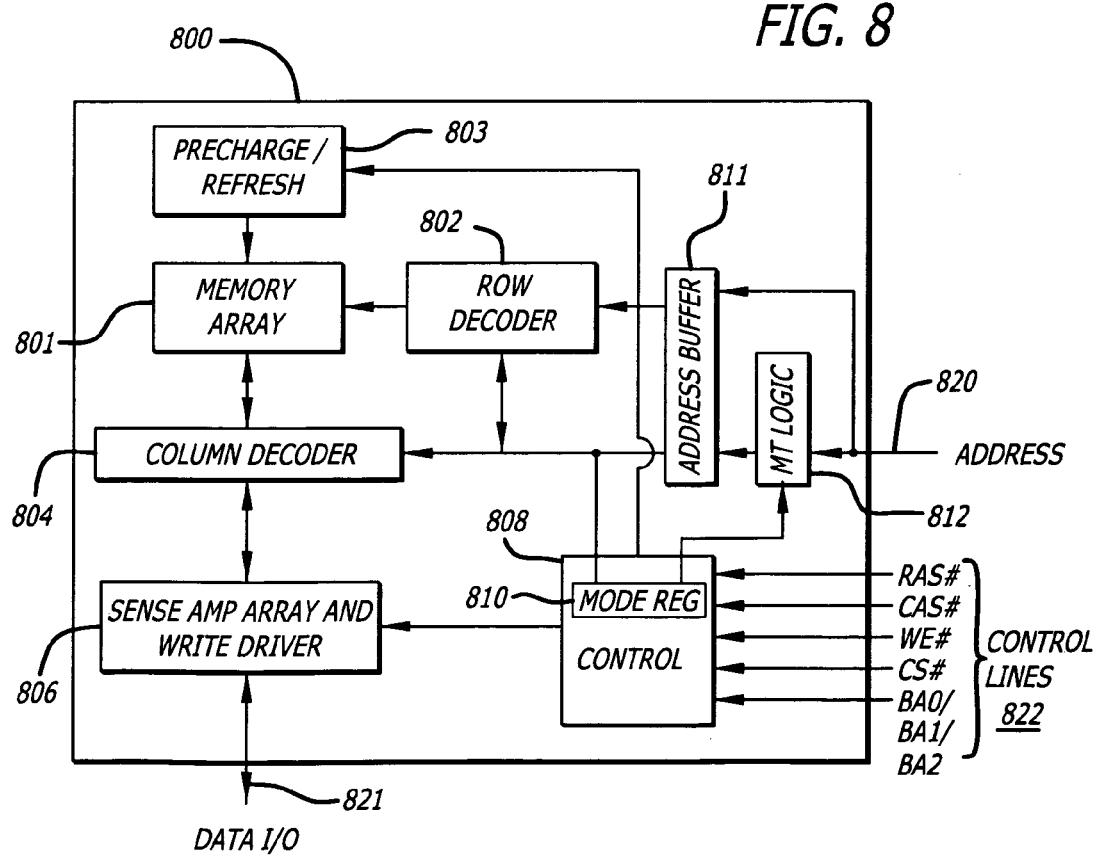
FIG. 8 illustrates a block diagram of a memory integrated circuit to support micro-tile memory accesses over memory sub-channels.

Referring now to FIG. 8, a block diagram of a memory integrated circuit 800 is illustrated. The memory integrated circuit 800 may be included in the memory modules MM1-MMn as the one or more memory devices 752. The memory integrated circuit 800 includes a memory array 801, a row address decoder 802, bitline precharge/refresh logic 803, a column decoder 804, a sense amp array and write driver block 806, a controller 808, an address buffer 811, and micro-tile control logic 812 coupled together as shown. The micro-tile control logic 812 may also be referred to as overload logic (OL).

The controller 808 includes a mode register 810 with a plurality of bits that can be set/initialized to control the general functionality of the memory integrated circuit 800. The mode register includes bit storage circuits to store the bits. The bits of the mode register 810 may be set by applying the appropriate bit settings on address lines 820 or data lines 821 coincident with a load strobe. The load strobe may be generated by toggling one or more of the control lines 822 that are coupled into the controller 808 of the memory integrated circuit when the memory is idle. The controller 808 receives one or more of the control lines 822. The one or more control lines 822 may include row address strobe RAS#, column address strobe CAS#, write enable WE#, chip select CS#, bank selects BA0,BA1,BA2, or other standard memory integrated control inputs.

More specifically, the mode register 810 may be used to configure the integrated circuit 800 for micro-tile memory access. As will be discussed further below, one of the bits of the mode register 810 is a micro-tile enable bit. The micro-tile enable bit may be active high and referred to as MTE bit. Alternatively, the micro-tile enable bit may be active low and referred to as MTE#. In either case, the micro-tile enable bit may generally be referred to as the micro-tile enable bit or the MTE bit. The micro-tile enable bit is reset by default such that micro-tiling is disabled when the device is initially powered-up or reset. This allows the memory module 710 and the memory integrated circuit 800 to be backward compatible when inserted into systems that do not support micro-tiling. The mode register 810 further has one or more sub-channel select (SCS) bits to indicate the memory sub-channel to which the memory integrated is assigned and addressable. The MTE bit and the one or more SCS bits are coupled into the micro-tile control logic 812. In memory modules that do not support micro-tiling, there is no MTE bit 850 in any mode register that can be set to enable the micro-tile control logic 812.

While a load strobe may be generated by a load mode register command and used to load bit settings into the mode register, a new command may be introduced to read out the bit settings in the mode register from the memory integrated circuit. A status command may be provided to the memory integrated circuit to read out the bits of the mode register. The status command may be formed by uniquely toggling or setting the one or more of the control lines 822 that are coupled into the controller 808 of the memory integrated circuit when the memory is idle. In this case, the MTE bit 850 could be read out from the memory integrated circuits that support micro-tiling. In memory modules that do not support micro-tiling, there is no MTE bit setting in the mode register to read out and no status command may be available. In which case, the memory module and memory integrated circuits thereon would not respond to a status command and/or the MTE bit setting in response if micro-tiling is unsupported.

The micro-tile control logic 812 is coupled to a plurality of address signal lines 820 so as to couple addresses to the column address decoder 804 and/or the row address decoder 802 through the address buffer 811. The address buffer 811 may latch the address signals on the internal address signal lines to hold them for the address decoders. The control logic 812 is also coupled to the mode register of the controller to receive the micro-tile enable bit and at least one sub-channel select bit in order to support micro-tile memory accesses into the memory array 801. In response to the micro-tile enable bit and the at least one sub-channel select bit, the control logic 812 selects one or more of the address signal lines over which to capture independent address information for a predetermined sub-channel to which it is assigned. That is, only a subset of the address signal lines may be assigned to a predetermined sub-channel. The control logic 812 selects this subset of address signal lines to extract the independent address information. Other address signal lines may be used for other sub-channels or some may be shared address signal lines into each sub-channel. The control logic 812 couples the independent address information into the column address decoder 804 and/or the row address decoder 802. The selection of the one or more address signal lines by the control logic may be further responsive to a column address load signal (CAS#) and a transaction enable signal.

Additional control logic may be added into and around the micro-tile control logic 812 in order to further swizzle the independent address information for one significant bit to another significant bit position. This is to provide a somewhat linear addressing method, such as for screen refresh, when micro-tiling is enabled.

The sense amp array and write driver block 806 couples to the data input/output (I/O) bus and may receive control signals from the controller 808 to read data from the memory array or write data into the memory array 801. The sense amp array and write driver block 806 receives data to be written into the memory array 801 and drives data out that has been read from the memory array 801 over the data input/output (I/O) bus 821. The data input/output (I/O) bus 821 includes bidirectional data lines of the memory integrated circuit 800 that are typically 4, 8 or 16 bits wide.

The memory array 801 consists of memory cells that may be organized in rows and columns. The memory cells are typically dynamic random access memory (DRAM) cells but can optionally be a static type of random access memory (SRAM) cell or a non-volatile programmable (NVRAM) type of re-writeable memory cell.

The row address decoder 802 receives a row address on the address lines and generates a signal on one of the word lines (WL) in order to address a row of memory cells in the memory array 801. The column decoder 804 also receives a column address on the address lines and selects which columns within the row of memory cells are to be accessed. The column decoder 804 essentially selects bitlines into memory cells that are to be accessed. In a read access, the column decoder 804 functions as a multiplexer. In a write access, the column decoder 804 functions as a de-multiplexer. The column address decoder 804 selectively accesses columns of memory cells within the memory array 801 in response to shared column address signals and if the micro-tile enable bit within the mode register is set, the column address decoder 804 selectively accesses columns of memory cells within the memory array 801 further in response to independent sub-channel column address signals.

The sense amp array and write driver block 406 may include sense amplifiers to determine whether a logical one or logical zero has been stored within the accessed memory cells during a read operation. The addressed memory cells try to drive a logical one or logical zero onto the selected bitlines of the memory array during the read operation. The sense amplifiers detect whether a logical one or logical zero has been driven out by the addressed memory cells onto the selected bitlines of the memory array during the read operation. The sense amp array and write driver block 406 may further include write drivers to drive a logical one or logical zero onto the selected bitlines of the memory array and into the addressed memory cells during a write operation.

The precharge/refresh block 803 couples to the bitlines in the memory array 801. The precharge/refresh block 803 may precondition the bitlines prior to addressing the memory cells during a read or write operation. The precharge/refresh block 803 may also refresh the data stored in the memory cells of the memory array 801 during periods of inactivity.

During specific memory cycles, some existing signal lines into the memory integrated circuit 800 are not used and can be re-targeted during this time for other purposes. For example during CAS (Column address strobe) cycles, not all the address lines are used. These unused address signal lines can be retargeted during the CAS cycle to communicate additional address information to the memory modules (e.g., DIMMs) and the memory integrated circuit devices therein. The memory controller 208 in the memory control block 202 sends additional address information over these unused address signal lines during the CAS cycle. The memory integrated circuit 800 with the added micro-tile control logic circuitry 812 and bits within the mode register 810 recognizes and decodes these overloaded signals on the previously unused address signal lines that were unused during the CAS cycles.

Figure 9:
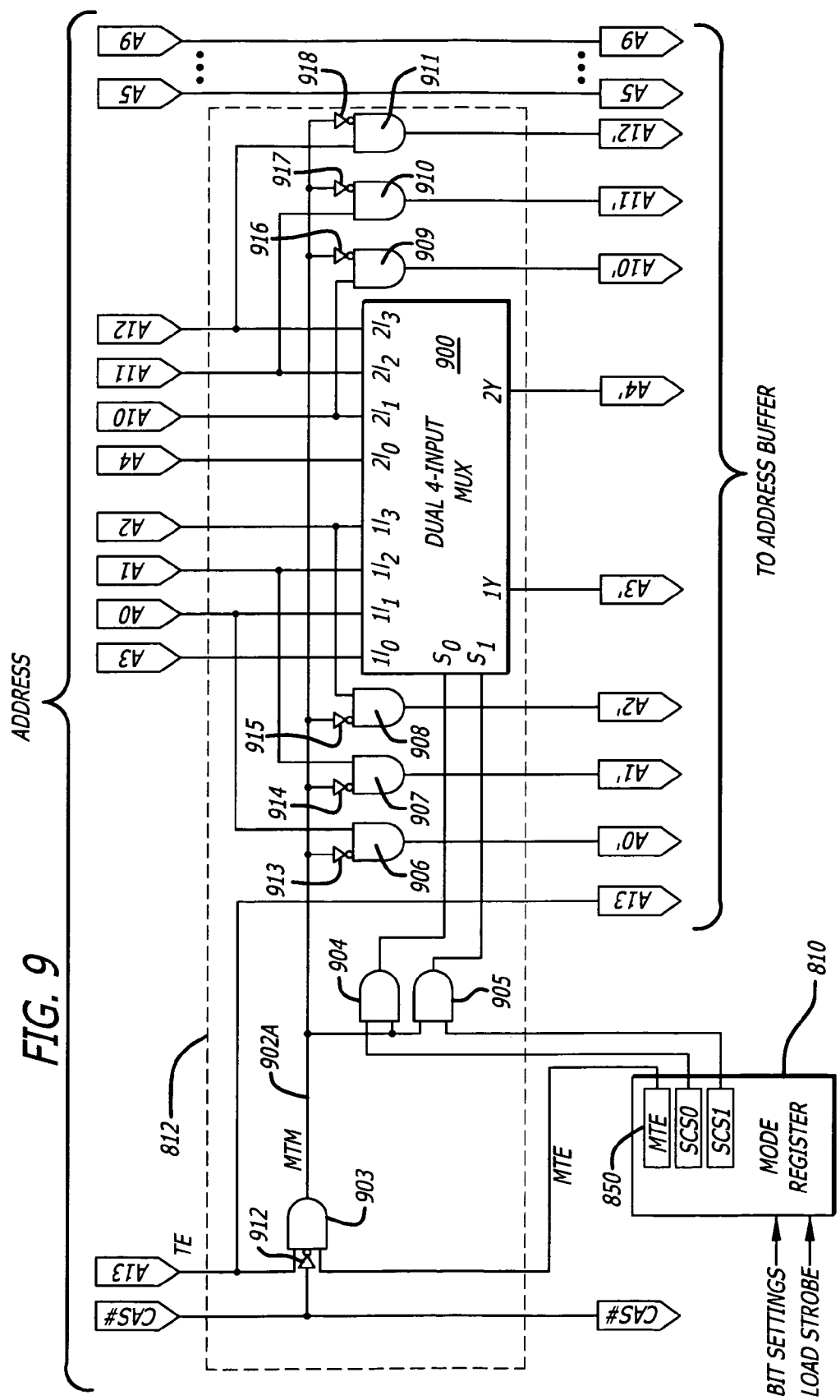
FIG. 9 illustrates a schematic diagram of address overload logic coupled to the mode register for a sixteen bit wide memory sub-channel and a sixteen byte memory access.

Referring now to FIG. 9, to support micro-tiling exemplary micro-tile memory control logic 812A coupled to a mode register 810A within a memory integrated circuit is illustrated. The exemplary implementation of the micro-tile memory control logic 812A decodes overloaded address signal lines that have additional address information provided during unused memory cycles, such as a CAS cycle. The schematic diagram of the micro-tile memory control logic 812A assumes that four sub-channels are provided each of which has a logical width of sixteen bytes to support micro-tiling.

Central to the micro-tile memory control logic 812A is a dual four input multiplexer 900 to capture the independent address information. The dual four input multiplexer 900 of the micro-tile memory control logic 812A selectively outputs shared column address signals or independent sub-channel column address signals on the multiplexed output (A3' and A4'). The outputs (A3' and A4') of the dual four input multiplexer are coupled to the input of the column address decoder. The independent sub-channel column address signals are the one or more independent column address signals that have been selected to be received by the respective memory sub-channel.

The micro-tile control logic 812A receives the address lines from address pins of the memory integrated circuit. The micro-tile control logic 812A provides addresses to the address buffer to be distributed to the row address decoder and the column address decoder. Some of the address pins of the memory integrated circuit receive shared row address signals, shared column address signals, independent column address signals, or a combination thereof. For example, address pins A5-A9 and A13 pass around the micro-tile control logic 812A and may receive shared row address signals and/or shared column address signals into each of the memory sub-channels. Address pins A0-A4 and A10-A12 are coupled into the dual four input multiplexer 900 and may receive shared row address signals and independent column address signals if micro-tiling is enabled. If micro-tiling is not enabled, address pins A3 and A4, coupled into the dual four input multiplexer 900, may receive shared row address signals and/or shared column address signals. A column address load strobe pin CAS# is coupled to the control logic 812A to receive a column address load strobe signal and selectively receive the appropriate one or more of the independent column address signals on the address pins assigned to a given sub-channel for capture inside the memory integrated circuit. The column address load strobe signal may also be used to receive and capture the shared column address signals off of the appropriate address pins.

The mode register 810A may include three bit storage circuits such as a flip flop or memory cell to store settings of a micro-tile enable (MTE) bit, a sub-channel select bit zero (SCS0) bit, and a sub-channel select bit one (SCS1) bit. These three bits in the mode register 810A are programmed with the appropriate sub-channel select bits and micro-tile enable bits. These three bits are set/reset from bit settings that the memory integrated circuit receives during initialization such as at power-up or reset. These three bits may also be set/reset when the memory integrated circuit is idle with no memory access in progress. The bit settings may be received over the address or data signal lines and loaded into the mode register in response to a load strobe signal generated by one or more control line inputs coupled into the memory integrated circuit. If micro-tiling is to be enabled in the memory integrated circuit, the micro-tile enable bit MTE is set. As the MTE bit is active high, it is set to a high logic level. If active low, the MTE# bit is set to a logic low level. In the exemplary control logic of FIG. 9, there are possibly four or less sub-channels within a memory channel. The SCS0 and SCS1 bits assign the memory integrated circuit to one of four memory sub-channels. Other memory integrated circuits on the same memory module may be assigned to another one of the four memory sub-channels.

Independent address information for each of the sub-channels is made available over the pre-existing address lines, such as address lines A0-A4 and A10-A12, during the CAS cycle. In this example, address lines A3 and A4 are ordinarily used. Thus, address lines A0, A1, A2, A10, A11, A12, and A13 are overloaded signal lines (A13 may be the micro-tile transaction enable—specified on a transaction basis). This method of overloading signal lines on existing address lines in effect provides six additional address lines (A0-A2 and A10-A12) to the memory integrated circuit devices without the use of additional traces (i.e., wire routing) or the use of additional pins.

The micro-tile memory control logic 812A is provided in each memory integrated circuit so that proper independent sub-channel address information is selected from the address lines A0-A4 and A10-A12 in response to the sub-channel select bits stored in the mode register. The settings of the sub-channel select bits are routed from the mode register 810A to the micro-tile memory control logic 812A to control the input selection process of the multiplexer 900. The output terminals of the multiplexer 900 are coupled to address signal lines A3' and A4'. Address signal lines A3' and A4' are coupled to an address decoder (e.g., column address decoder 804) to select memory cells within the memory array.

The micro-tile control logic may overload the memory address signal lines A3' and A4' during the column address write access time when CAS# is active low ("CAS cycle"). That is, address bits A0, A1, A2, A10, A11 and A12 are normally unused address bits when the column address is being written to the memory integrated circuit without micro-tiling. Address bits A3 and A4, substituted by A3' and A4', are address bits that are used to write the column address to the memory integrated circuit. While address bits are normally unused without micro-tiling during the CAS cycle, they may be used to select the row address in a memory integrated circuit when the row address is being written into the memory integrated circuit when RAS# is active low ("RAS cycle"). This is referred to herein as address overloading. While A0, A1, A2, A10, A11 and A12 are illustrated as being the unused address bits during column address strobe CAS# in FIG. 9, different unused address bits may be utilized as the overloaded address signal lines to support micro-tiling.

The micro-tile memory control logic 812A includes the dual four input multiplexer 900, a three input AND gate 903, a plurality of two input AND gates 904-911, and a plurality of inverters 912-918 coupled together as shown. It is well understood that an AND gate may be formed by the combination of a NAND gate with an inverter having its coupled to the output of the NAND gate.

The dual four-input multiplexer 900 is a pair of four to one multiplexers each having a first select control input S0 coupled together and a second select control input S1 coupled together. The first four to one multiplexer receives inputs 1I0-1I3 and provides the output 1Y in response to the select control inputs S0 and S1. The second four to one multiplexer receives inputs 2I0-2I3 and provides the output 2Y in response to the select control inputs S0 and S1. If S0 and S1 are both logical low or zero, the inputs 1I0 and 2I0 are multiplexed onto the respective outputs 1Y and 2Y. If S0 is a logical high or one and S1 is a logical low or zero, the inputs 1I1 and 2I1 are multiplexed onto the respective outputs 1Y and 2Y. If S0 is a logical low or zero and S1 is a logical high or one, the inputs 1I2 and 2I2 are multiplexed onto the respective outputs 1Y and 2Y. If S0 and S1 are both logical high or one, the inputs 1I3 and 2I3 are multiplexed onto the respective outputs 1Y and 2Y.

The first four-input multiplexer of the dual four-input multiplexer 900 receives the address bits A3, A0, A1, and A2 at its respective 1I0-1I3 inputs and selects one of them to be driven onto the address signal line A3' at its 1Y output. The second four-input multiplexer receives address bits A4 and A10-A12 at its respective 2I0-2I3 inputs and selects one of them to be driven onto the address signal line A4' at its 2Y output. The select control inputs S0 and S1 are respectively coupled to the outputs of the AND gates 904-905.

The AND gate 903 generates a micro-tile mode signal (MTM) 902A at its output. The micro-tile mode signal 902A is active high and generated at the appropriate time when the independent address signals are on the overloaded address signal lines coupled into the dual four-input multiplexer 900. Inverter 912 inverts the active low CAS# signal into an active high CAS signal at its output which is coupled into an input of the AND gate 903. AND gate 903 logically ands the CAS signal, the MTE bit setting (ME), and the transaction enable signal (TE, address bit A13) to generate the micro-tile mode signal 902A. That is if micro-tile is enabled by the MTE bit and the transaction is enabled by the TE signal, the micro-tile mode signal (MTM) 902A is generated when CAS# goes low.

The micro-tile mode signal (MTM) 902A is coupled into the inputs of AND gates 904 and 905 to gate the sub-channel select bits SCS0 and SCS1. If the micro-tile mode signal (MTM) 902A is low for any reason, the select controls S0 and S1 into the multiplexer 900 are logically low or zero at the output of the AND gates 904 and 905. With S0 and S1 being both logical low or zero, the address bits A3 and A4 respectively coupled to the inputs 1I0 and 2I0 are respectively multiplexed onto the address signal lines A3' and A4' at the respective outputs 1Y and 2Y. Bits A3 and A4 merely pass through to signal lines A3' and A4' respectively. This is the default condition if micro-tiling is not enabled or if bits A3 and A4 are used for any other purpose, such as row addressing.

When the micro-tile mode signal (MTM) 902A is active high, the sub-channel select bits SCS0 and SCS1 are respectively coupled into the select control inputs S0 and S1 of the multiplexer 900 by passing through the AND gates 904 and 905, respectively. Thus, when the micro-tile mode signal (MTM) 902A is generated to be active high by the AND gate 903, the sub-channel select bits SCS0 and SCS1 control the selection of the multiplexing of the respective four inputs to the respective outputs of the multiplexer 900. Effectively the settings of the sub-channel select bits SCS0 and SCS1, indicating the sub-channel to which the memory IC may be assigned, determines which address bit lines coupled into the multiplexer 900 are used to capture the independent address signals during the CAS cycle.

The settings of the sub-channel select bits SCS0 and SCS1 will vary from one sub-channel to the next. For four sub-channels, there are four different settings for SCS0 and SCS1 respectively. Note however that micro-tile control logic designed to support four sub-channels can be readily reduced to support two sub-channels by using only two different settings of the sub-channel select bits SCS0 and SCS1. With the different settings for SCS0 and SCS1, the multiplexer 900 selects different address signal lines to capture the independent address signals when the micro-tile mode signal is generated.

The micro-tile mode signal (MTM) 902A is also coupled into the inverters 913-918 at a first input to the AND gates 906-911, respectively. The address signals A0, A1, A2, A10, A11, and A12 are respectively coupled into the second input of the AND gates 906-911. The micro-tile mode signal (MTM) 902A effectively gates the signals on the address lines A0, A1, A2, A10, A11, and A12 into the memory integrated circuit respectively at the outputs A0', A1', A2', A10', A11', and A12' of the AND gates 906-911. That is, when the micro-tile mode signal (MTM) 902A is logically low or zero, the AND gates 906-911 allow the signals on address lines A0, A1, A2, A10, A11, and A12 to pass through onto the outputs A0', A1', A2', A10', A11', and A12' and to the address decoders. When the micro-tile mode signal (MTM) 902A is logically high or one, the AND gates 906-911 drive all the outputs A0', A1', A2', A10', A11', and A12' to logical low or zero. Thus when the micro-tile mode signal (MTM) 902A is active high to capture the independent address information, the outputs A0', A1', A2', A10', A11', and A12' are not used as they are all driven to zero.

Detecting Micro-Tile Enabled Memory Modules and Memory ICS

Figure 10A:
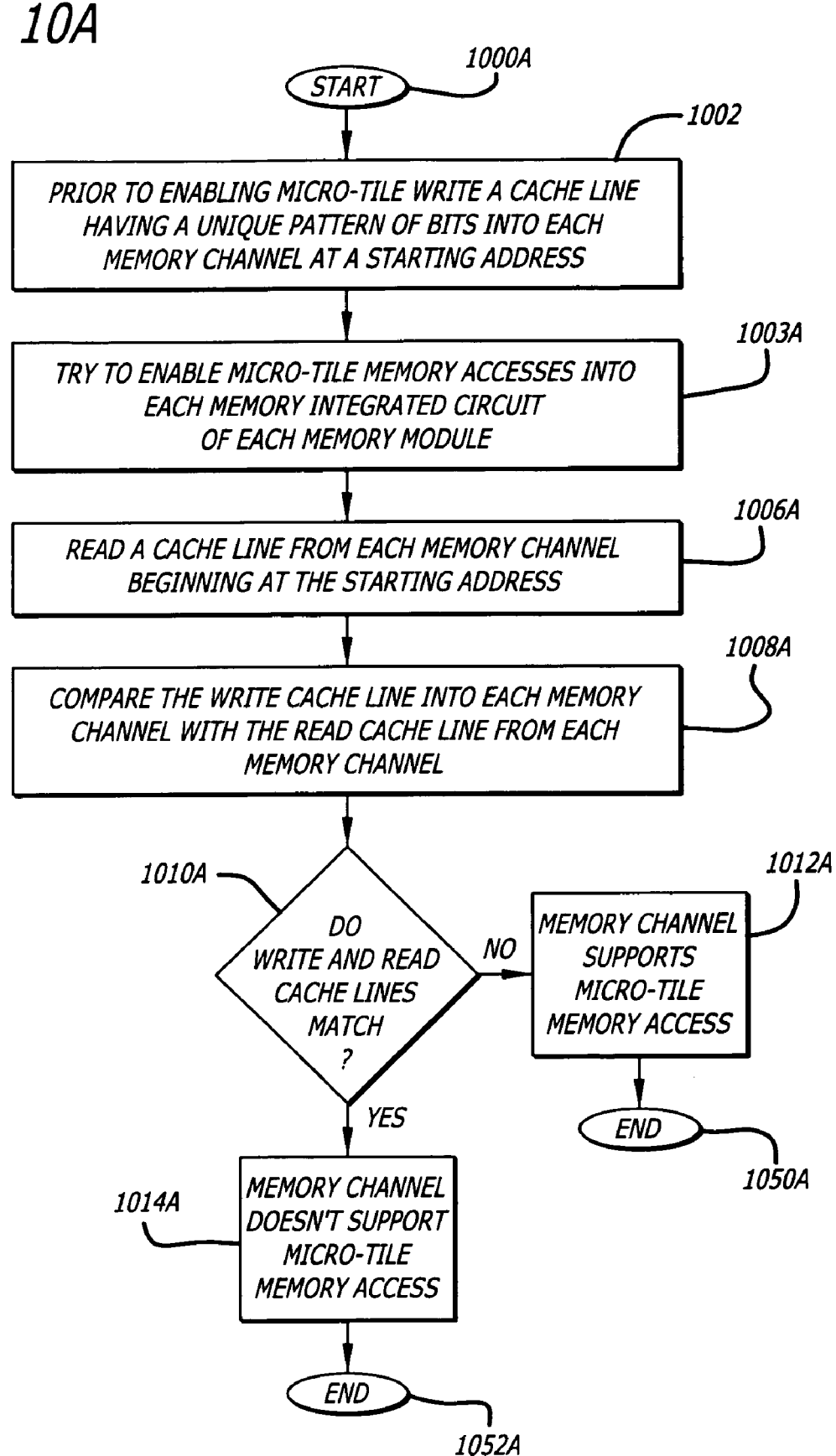
FIG. 10A illustrates a flow chart of a first method of detection for support of micro-tile memory access in a memory integrated circuit.

Referring now to FIG. 10A, a flow chart of a first method of detection for support of micro-tile memory access in a memory integrated circuit is illustrated. The method starts at block 1000A with a host printed circuit board and system capable of supporting micro-tile memory accesses. Memory request reordering in the memory controller is disabled in order to detect micro-tile enabled memory modules and memory integrated circuits. Otherwise, a reordering of the memory requests could provide a false indication.

At block 1002 prior to enabling micro-tiling in the memory modules and the memory integrated circuits, a cache line with a unique pattern of bits is written into each memory channel at a starting address. With micro-tiling disabled, the starting address is a shared starting address into each memory module and memory integrated circuit. The unique pattern of bits in the cache line may be similar to that of FIG. 11A that designate the order of bytes in the cache line, or another unique pattern to distinguish neighboring bytes such as those illustrated in FIGS. 12A-12E. The unique pattern of bits in the cache line may be used to perform double duty in that it may used to detect micro-tile capability as well as be used to test the memory in the memory modules for memory errors. More that one cache line with the same pattern may be written into the memory at different starting addresses.

Next at block 1003A, an attempt is made to enable micro-tile memory accesses into each memory integrated circuit of each memory module in the memory channel. The memory modules that support micro-tile memory accesses will be so enabled. The memory modules that do not support micro-tile memory accesses, if any, will not be enabled. In this case, the attempt to enable micro-tile memory accesses into the memory modules and memory integrated circuits that do not support micro-tile memory will fail. Additionally, an attempt to set the one or more sub-channel select (SCS) bits in mode registers of the memory integrated circuits may be made to assign them to their respective sub-channels.

At block 1006A after attempting to enable micro-tile accesses into the memory, a memory request to read a cache line beginning at the same starting address is issued to the memory control block and the memory controllers. While a request is made at the same starting address, the micro-tiled memory controller with micro-tiling enabled attempts to translate the starting address into an independent starting address into each memory sub-channel if micro-tiled memory access is enabled in the memory modules and memory integrated circuits. However if micro-tiled memory access is not enabled and supported in the memory modules and memory integrated circuits, the read request at the same starting address is not interpreted as an independent address by the memory modules and memory integrated circuits. Instead, it is interpreted as a shared address and the same memory locations are accessed in each as in the write access. While the memory request for the cache line is issued using the same starting address, micro-tiling uses independent addresses into each sub-channel and memory integrated circuit therein to access data in the sub-channels of each memory channel. If the memory integrated circuits and memory modules do not support micro-tiling so that independent addressing is not available, the same starting address is used into each memory integrated circuit during the read request as was used to write the unique data bit pattern. In which case, the same unique data bit pattern that was written will be read out from the memory modules and memory integrated circuits that do not support micro-tiling.

This may be graphically illustrated by FIGS. 4A-4C. In FIG. 4A, micro-tiling is not enabled such that a 64 byte cache line of data renders a span 404A of a 4×4 pixel tile. In FIG. 4B, micro-tiling is enabled with two sub-channels in each memory channel. A double subspan 414A from one sub-channel may render a portion of the span 404A while another unrelated double subspan such as double 414B is accessed by the other sub-channel of the memory channel. That is, different memory locations are accessed with micro-tiling enabled. In FIG. 4C, micro-tiling is enabled with four sub-channels in each memory channel. A subspan 424A from one sub-channel may render a portion of the span 404A while other unrelated subspans, such as subspans 424B-424D, are accessed by the other sub-channels of the memory channel. This graphically illustrates that with micro-tiling enabled, other memory locations are accessed by a cache line than if micro-tiling is disabled. The difference in memory accesses between micro-tiling being disabled and enabled is also illustrated in FIGS. 5A-5C and FIGS. 11A-11C and described further below.

Next at block 1008A, a comparison is made between the cache line written into the memory channel (referred to as a write cache line) with micro-tiling disabled and the cache line read from the memory channel (referred to as a read cache line) with micro-tiling enabled, if possible, in the memory integrated circuits and memory modules. If micro-tiling cannot be enabled in the memory modules and memory integrated circuits, the write and read memory accesses using the same starting address access the same memory locations so that there is no difference in the data bits of the cache line that is written into memory and read from memory.

At block 1010A, a determination is made as to whether or not the bits in the read cache line matches the bits in the write cache line. At block 1012A, the bits in the read cache line do not match the bits in the write cache line indicating that the memory channel, the memory modules and memory integrated circuits support micro-tile memory accesses and the method then ends at block 1050A. At block 1014A, the bits in the read cache line match the bits in the write cache line indicating that the memory channel, the memory modules and memory integrated circuits do not support micro-tile memory accesses and the method then ends at block 1052A.

Figure 10B:
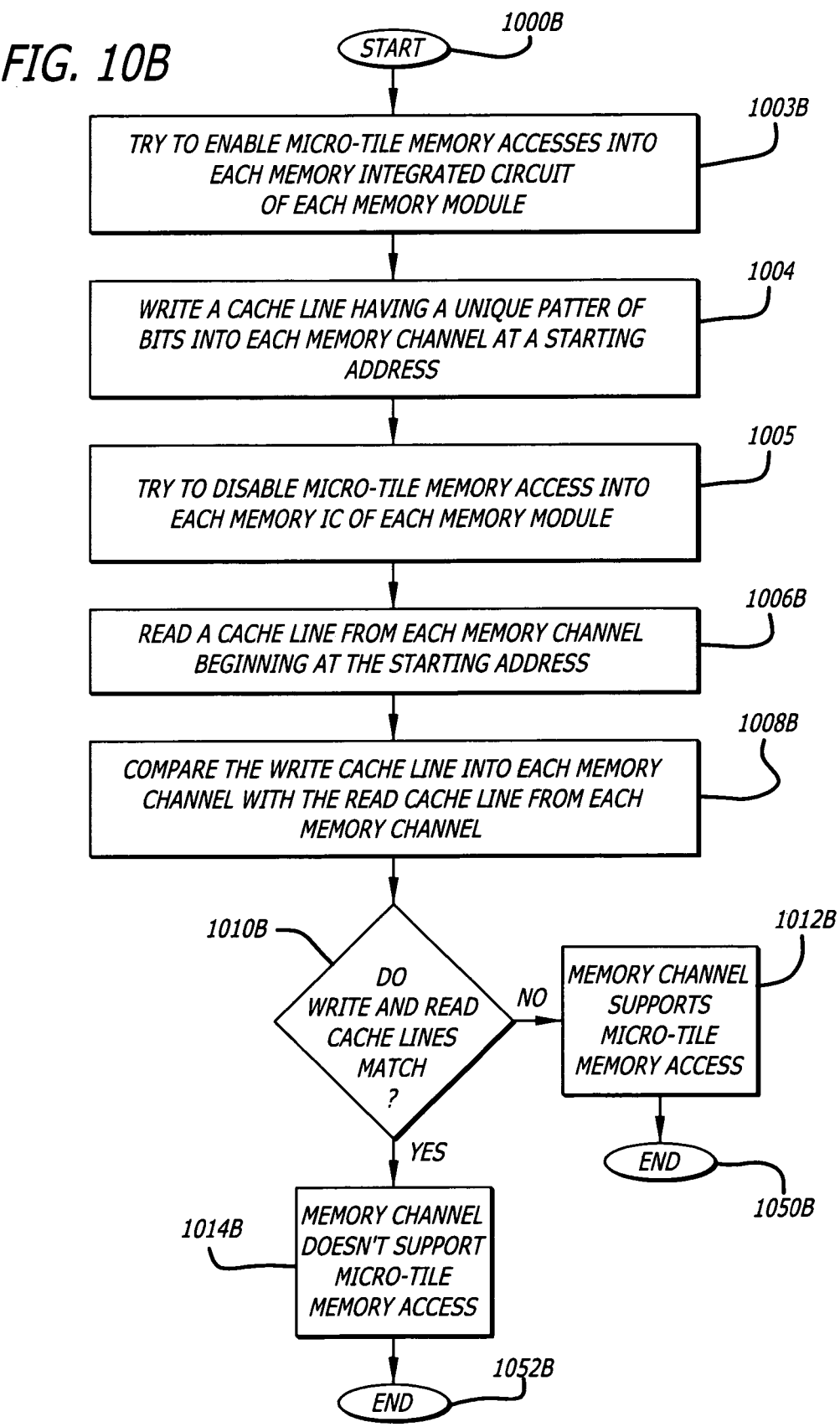
FIG. 10B illustrates a flow chart of a second method of detection for support of micro-tile memory access in a memory integrated circuit.

Referring now to FIG. 10B, a flow chart of a second method of detection for support of micro-tile memory access in a memory integrated circuit is illustrated. The method starts at block 1000B with a host printed circuit board and system capable of supporting micro-tile memory accesses.

At block 1003A, an attempt is made to enable micro-tile memory accesses into each memory integrated circuit of each memory module in the memory channel. The memory modules that support micro-tile memory accesses will be so enabled. The memory modules that do not support micro-tile memory accesses, if any, will not be enabled. In this case, the attempt to enable micro-tile memory accesses into the memory modules and memory integrated circuits that do not support micro-tile memory will fail. Additionally, an attempt to set the one or more sub-channel select (SCS) bits in mode registers of the memory integrated circuits may be made to assign them to their respective sub-channels.

At block 1004 after enabling micro-tiling in the memory modules and the memory integrated circuits if possible, a cache line with a unique pattern of bits is written into each memory channel at a starting address. The unique pattern of bits in the cache line may be similar to that of FIG. 11A that designate the order of bytes in the cache line, or another unique pattern to distinguish neighboring bytes such as those illustrated in FIGS. 12A-12E. The unique pattern of bits in the cache line may be used to perform double duty in that it may used to detect micro-tile capability as well as be used to test the memory in the memory modules for memory errors. More that one cache line with the same pattern may be written into the memory at different starting addresses.

At block 1005, an attempt is made to disable micro-tile memory accesses into each memory integrated circuit of each memory module in the memory channel. The memory modules that support micro-tile memory accesses will be so disabled. The memory modules that do not support micro-tile memory accesses, if any, will remain the same—unable to support micro-tile memory access.

At block 1006B, a memory request to read a cache line beginning at the same starting address is issued to the memory control block and the memory controllers. While the memory request for the cache line is issued using the same starting address, micro-tiling uses independent addresses into each sub-channel and memory integrated circuit therein to access data in the sub-channels of each memory channel. If the memory integrated circuits and memory modules do not support micro-tiling so that independent addressing is not available, the same starting address is used into each memory integrated circuit during the read request as was used to write the unique data bit pattern. In which case, the same unique data bit pattern that was written will be read out from the memory modules and memory integrated circuits that do not support micro-tiling.

Next at block 1008B, a comparison is made between the cache line written into the memory channel (referred to as a write cache line) with micro-tiling enabled if possible and the cache line read from the memory channel (referred to as a read cache line) with micro-tiling disabled in the memory integrated circuits and memory modules. If micro-tiling cannot be enabled in the memory modules and memory integrated circuits, the write and read memory accesses using the same starting address access the same memory locations so that there is no difference in the data bits of the cache line that is written into memory and read from memory.

At block 1010B, a determination is made as to whether or not the bits in the read cache line matches the bits in the write cache line. At block 1012B, the bits in the read cache line do not match the bits in the write cache line indicating that the memory channel, the memory modules and memory integrated circuits support micro-tile memory accesses and the method then ends at block 1050B. At block 1014B, the bits in the read cache line match the bits in the write cache line indicating that the memory channel, memory modules and memory integrated circuits do not support micro-tile memory accesses and the method then ends at block 1052B.

Figure 10C:
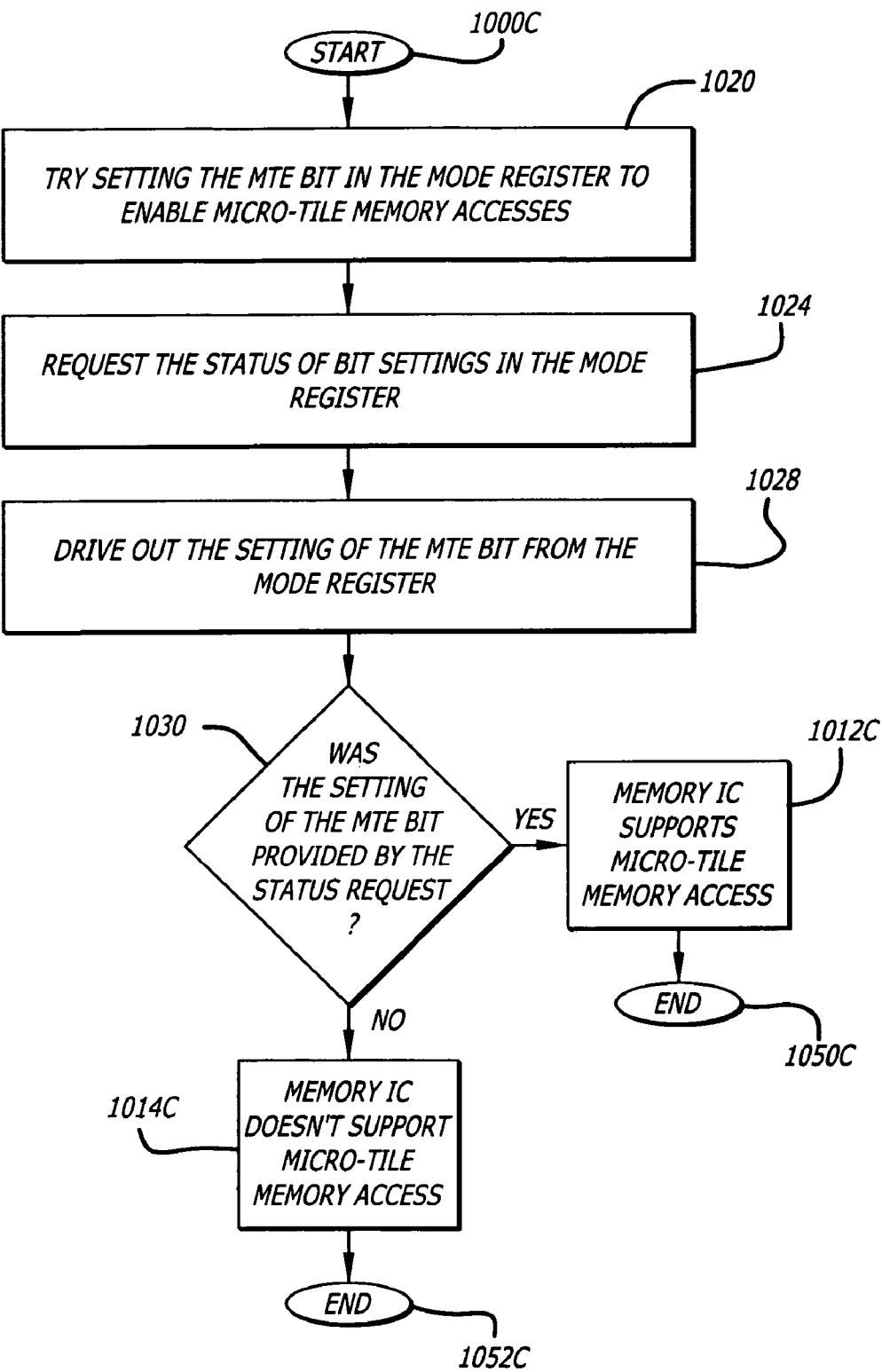
FIG. 10C illustrates a flow chart of a third method of detection for support of micro-tile memory access in a memory integrated circuit.

Referring now to FIG. 10C, a flow chart of a third method of detection for support of micro-tile memory access in a memory integrated circuit is illustrated. The method starts at block 1000C with a host printed circuit board and system capable of supporting micro-tile memory accesses. In this embodiment of the invention, a status request to the memory integrated circuit provides the bit setting of the micro-tile enable bit as well as other bit settings of the mode register. In memory integrated circuits unable to support micro-tile memory accesses, the micro-tile enable bit is non-existent so that the memory bit setting is not provided by the memory integrated circuit in response to a status request.

At block 1020, an attempt is made to set a micro-tile enable bit in a mode register of a memory integrated circuit in order to enable micro-tile memory accesses. If the memory IC includes the MTE bit within a mode register, the MTE bit will be set. If the memory IC does not have an MTE bit to set within a mode register, the attempt to set it will fail and nothing will occur.

At block 1024, a request for the status of the bit settings in the mode register is sent to the memory integrated circuit. The memory integrated circuit may receive the request for status if the command is supported therein. If not, the request for status command is ignored.

At block 1028, if the memory integrated circuit supports micro-tiling, it will drive out the setting of the micro-tile enable bit from the register indicating that micro-tile memory accesses are enabled. If the memory integrated circuit does not support micro-tiling, it will not drive out the setting of a micro-tile enable bit and may ignore the request for status completely. As discussed previously, the micro-tile enable signal may be active low or active high to indicate the enablement of micro-tile memory accesses. If an active low signal, the micro-tile enable bit is set to a logical zero to enable micro-tile memory accesses in the memory integrated circuit. If an active high signal, the micro-tile enable bit is set to a logical one to enable micro-tile memory accesses in the memory integrated circuit.

At block 1030, a determination is made as to whether or not the setting of the MTE bit was provided in response to the status request. At block 1012C, the MTE bit setting was provided indicating that the micro-tile memory accesses are enabled and that the memory integrated circuit supports micro-tile memory accesses and the method then ends at block 1050C. At block 1014C, the MTE bit setting was not provided indicating that the memory integrated circuit does not support micro-tile memory accesses and the method then ends at block 1052C.

Referring now to FIG. 11A, an exemplary unique bit sequence in a cache line for a memory channel 500A is illustrated. The bits in the cache line in FIG. 11A are organized into 8 bit bytes that are associated with the byte numbering illustrated in FIG. 5A. In this manner, each of the bytes in the cache line are unique from each other so that if they are reordered in a different sequence it can be readily detected. That is, the cache line has a unique data bit pattern that can be used to detect if micro-tiling can be enabled or not. In each byte, the most significant bit (MSB) is shown on the left end while the least significant bit (LSB) is shown at the right end of the byte. FIG. 11A illustrates the byte positions and bit settings for bytes 1100A, 1101A, 1106A, 1107A, 1108A, 1109A, 1113A, 1114A, 1156A, 1157A, 1162A, and 1163A. The zero byte 1100A has all of its bits set to zero to indicate zero in binary. The seventh byte 1107A has its three LSBs set to one to indicate the number seven in binary notation. The fifty-sixth byte 1156A has third through fifth bits set to one to indicate the number fifty-six in binary notation. The sixty-third byte 1163A has its zeroeth through fifth bits set to one to indicate the number sixty-three in binary notation. The bit settings for the bytes between byte 1100A and 1163A not illustrated in FIG. 11A are readily ascertainable from the pattern provided in FIG. 11A and the byte numbering illustrated in FIG. 5A. In FIG. 11A, the cache line in this form may be written and read from memory without micro-tile being enabled or supported.

FIG. 11B illustrates how the cache line of FIG. 11A and its bit sequence may be rearranged in a memory channel 500B that has two sub-channels 505A-505B with micro-tiling being enabled and supported. The bytes in the cache line in FIG. 11B are organized into the two sub-channels 505A-505B and are associated with the byte numbering in each sub-channel illustrated in FIG. 5B. FIG. 11B illustrates the byte positions and the bit settings for bytes 1100B, 1101B, 1104B, 1105B, 1124B, 1125B, 1128B, and 1129B in one sub-channel 505A. FIG. 11B further illustrates the byte positions and the bit settings for bytes 1134B, 1135B, 1138B, 1139B, 1158B, 1159B, 1162B, and 1163B in sub-channel 505B. The bit settings for the bytes not illustrated in FIG. 11B are readily ascertainable from the pattern provided in FIG. 11B and the byte numbering illustrated in FIG. 5B.

FIG. 11C illustrates how the cache line of FIG. 11A and its bit sequence may be rearranged in a memory channel 500C that has four sub-channels 505A-505D with micro-tiling being enabled and supported. The bytes in the cache line in FIG. 11C are organized into the four sub-channels 505A-505D and are associated with the byte numbering in each sub-channel illustrated in FIG. 5C. FIG. 11B illustrates the byte positions and the bit settings for bytes 1100C, 1108C, 1101C, 1109C, 1106C, 1114C, 1107C, and 1115C in the first sub-channel 515A. FIG. 11B further illustrates the byte positions and the bit settings for bytes 1148C, 1156C, 1149C, 1151C, 1154C, 1162C, 1155C, and 1163C in the fourth sub-channel 515D. The byte positions for the second and third sub-channels 515B-515C is illustrated in FIG. 5C. The bit settings for sub-channels and the bytes not illustrated in FIG. 11C are readily ascertainable from the pattern provided in FIG. 11C and the byte numbering illustrated in FIG. 5C.

The positions of the most of the bytes illustrated in FIGS. 11B-11C and 5B-5C differ from the positions of the bytes in FIGS. 11A and 5A. However in comparing FIGS. 11A-11C and FIGS. 5A-5C, the bits and bytes in the zeroeth byte 1100A, 1100B, 1100C and the sixty-third byte 1163A, 1163B, and 1163D do not change when viewed across the overall memory channel. Thus, these bytes alone may not provide an accurate indication as to whether or not micro-tiling is enabled or not. In which case, additional bytes of bits are used to compare and detect whether or not micro-tiling is enabled or not.

In the method of detection described in FIG. 10A, the cache line of FIG. 11A may be written into the memory channel without micro-tiling being enabled. With micro-tiling then enabled, an attempt to read out the cache line at the same starting address may result in a cache line of data such as that illustrated in FIG. 11B or FIG. 11C. If micro-tiling is supported, it is expected that the cache line of data that is retrieved will differ from that written, such as in the bit or byte ordering. If micro-tiling is not supported, when reading the cache line out at the same starting address, the data that is returned is expected to have the same bit and byte order. That is, if micro-tiling is not supported, the cache line will be read out in the bit and byte order as illustrated in FIGS. 11A and 5A, respectively.

In the method of detection described in FIG. 10B, with micro-tiling being enabled, the cache line may be written into memory as illustrated in FIG. 11B associated with the byte numbering of FIG. 5B, if two memory sub-channels are being supported. Alternatively, the cache line may be written into memory as illustrated in FIG. 11C associated with the byte numbering of FIG. 5C, if four memory sub-channels are being supported. Then after disabling micro-tiling, the cache line may be read out from the memory in the order illustrated in FIG. 11A associated with the byte numbering of FIG. 5A, if micro-tiling is supported. If micro-tiling is not supported, it is expected to be read out from the memory channel in the same bit and byte order as written.

As discussed previously, FIG. 11A illustrates the bits in the cache line being organized into 8 bit bytes and with bits being set associated with the byte numbering illustrated in FIG. 5A. However, other unique bit patterns may be used in the bytes of the cache line to determine if the bytes have been reordered and the bit pattern of the cache line altered.

Reference is now made to FIGS. 12A-12E illustrating other bit patterns that may be used in the cache line to provide a distinguishable pattern to detect support of micro-tile memory access in a memory integrated circuit.

Figure 12A:
FIGS. 12A-12E illustrate other bit patterns than may be used to provide a distinguishable pattern in a cache line to detect support of micro-tile memory access in a memory integrated circuit.

FIG. 12A illustrates a checkerboard pattern from one byte to the next. That is, the bits of one byte are all set to a logical one while the bits of the neighboring bytes are all set to logical zero.

Figure 12B:

FIG. 12B illustrates a checkerboard pattern from in each half of a byte. That is, one half of the bits in the byte are set to a logical one while the other half of the bits of the byte are set to a logical zero. The neighboring bytes may flip the bit settings or maintain the same pattern.

Figure 12C:

FIG. 12C illustrates an altering one and zero pattern that might be used in bytes of the cache line. In each byte, the bits alter between logical zero and logical one.

Figure 12D:

FIG. 12D illustrates a walking one pattern that may be used in bytes of the cache line. A first byte begins with all zeroes and then a single one bit is walked from MSB to LSB or from LSB to MSB as is illustrated in FIG. 12D.

Figure 12E:

FIG. 12E illustrates a walking zero pattern that may be used in bytes of the cache line. A first byte begins with all ones and then a single zero bit is walked from MSB to LSB or from LSB to MSB as is illustrated in FIG. 12E.

While the patterns are illustrated as being repetitive, any combination of patterns may be used provided that the bit pattern and byte order may be distinguishable to detect whether or not micro-tiling is enabled and supported in the memory modules and memory integrated circuits. While these patterns have been described as being used to detect whether or not micro-tiling is enabled in the memory modules and memory integrated circuits, they may also be concurrently used to test for errors in the memory.

To support a micro-tiling memory architecture, the memory subsystem has been improved to allow sub-channel accesses. However, not all memory modules may support micro-tile memory accesses. Embodiments of the invention detect which memory modules plugged into a system are micro-tile enabled from those that are not. In this manner, the micro-tiling memory architecture may be backward compatible with pre-existing memory modules that do not support micro-tile memory accesses.

While certain exemplary embodiments have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art.

When implemented in software, the elements of the embodiments of the invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a read only memory (ROM), a flash memory, an erasable programmable read only memory (EPROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

What is claimed is:

1. A method comprising:
   at a starting address, writing a write cache line with a unique bit pattern into memory in a memory channel;
   attempting to enable independently addressable sub-channel memory accesses by setting an enable bit upon receiving a status command at each memory integrated circuit on memory modules in the memory channel supporting independently addressable sub-channel memory accesses;
   requesting to read a read cache line from memory in the memory channel at the starting address;
   comparing bit patterns of the read cache line and the write cache line to determine if independent sub-channel memory access is enabled into each memory integrated circuit;
   enabling independently addressable sub-channel memory access into each memory integrated circuit on memory modules in the memory channel if the bit pattern of the read cache line differs from the write cache line, wherein each memory channel includes an independent data bus and each independently addressable sub-channel includes an independent set of bits on the independent data bus from all other independently addressable sub-channels; and
   not enabling independently addressable sub-channel memory access into each memory integrated circuit on memory modules in the memory channel if the bit pattern of the read cache line is the same as the bit pattern of the write cache line memory integrated circuit on memory modules in the memory channel.

2. The method of claim 1, wherein
   the independent sub-channel memory accesses into each memory integrated circuit are micro-tile memory accesses.

3. The method of claim 1, wherein
   the starting address is translated and interpreted as an independent address by the memory in each memory sub-channel during the requesting to read the read cache line, if independent sub-channel is enabled.

4. The method of claim 1, wherein
   prior to attempting to enable independent sub-channel memory accesses,
   reading the write cache line with the unique bit pattern from the memory in the memory channel to detect memory errors.

5. The method of claim 4, wherein
   the unique bit pattern of the write cache line is a memory test pattern.

6. The method of claim 4, wherein
   the unique bit pattern of the write cache line is a walking ones test pattern, a walking zeroes test pattern, or a combination thereof.

7. The method of claim 4, wherein
   the unique bit pattern of the write cache line is a checkerboard test pattern.

8. A method comprising:
   attempting to enable micro-tile memory accesses into by setting an enable bit upon receiving a status command at each memory integrated circuit on memory modules in the memory channel supporting micro-tile memory accesses;
   at a starting address, writing a write cache line with a unique bit pattern into memory in a memory channel;
   attempting to disable micro-tile memory accesses into each memory integrated circuit on memory modules in the memory channel;
   requesting to read a read cache line from memory in the memory channel at the starting address;
   comparing bit patterns of the read cache line and the write cache line to determine if micro-tile memory access is enabled into each memory integrated circuit;
   enabling independently addressable sub-channel memory access into each memory integrated circuit on memory modules in the memory channel if the bit pattern of the read cache line differs from the write cache line, wherein each memory channel includes an independent data bus and each independently addressable sub-channel includes an independent set of bits on the independent data bus from all other independently addressable sub-channels; and
   not enabling independently addressable sub-channel memory access into each memory integrated circuit on memory modules in the memory channel if the bit pattern of the read cache line is the same as the bit pattern of the write cache line memory integrated circuit on memory modules in the memory channel.

9. The method of claim 8, wherein
   the starting address is translated and interpreted as an independent address by the memory in each memory sub-channel during the requesting to read the read cache line, if micro-tiling is enabled.

10. The method of claim 8, wherein
    prior to attempting to enable micro-tile memory accesses,
    reading the write cache line with the unique bit pattern from the memory in the memory channel to detect memory errors.

11. The method of claim 10, wherein
    the unique bit pattern of the write cache line is a memory test pattern.

12. The method of claim 10, wherein
    the unique bit pattern of the write cache line is a walking ones test pattern, a walking zeroes test pattern, or a combination thereof.

13. The method of claim 10, wherein
    the unique bit pattern of the write cache line is a checkerboard test pattern.

14. A method in a memory integrated circuit comprising:
    receiving a shared starting address to write a unique pattern of data bits into memory cells in a memory array;
    writing the unique pattern of data bits into memory cells in the memory array beginning at the shared starting address;
    setting a micro-tile enable bit within a register upon receiving a status command to enable independently addressable sub-channel accesses into memory cells in the memory array;
    receiving an independent starting address differing from the shared starting address to read data bits from memory cells in the memory array, wherein each memory channel includes an independent data bus and each independently addressable sub-channel includes an independent set of bits on the independent data bus from all other independently addressable sub-channels; and reading data bits from memory cells in the memory array beginning at the independent starting address.

15. The method of claim 14, wherein the unique pattern of data bits is a memory test pattern.

16. The method of claim 14, wherein the unique bit pattern of the write cache line is a checkerboard test pattern.

17. A method in a memory integrated circuit comprising:

setting a micro-tile enable bit within a register upon receiving a status command to enable independently addressable sub-channel accesses into memory cells in the memory array, wherein each memory channel includes an independent data bus and each independently addressable sub-channel includes an independent set of bits on the independent data bus from all other independently addressable sub-channels;

receiving a request for status of bit settings in the register; and providing an indication that the micro-tile enable bit is set within the register to enable micro-tile memory accesses.

18. The method of claim 17, wherein the register is a mode register within the memory integrated circuit.

19. The method of claim 17, wherein a micro-tile enable signal is active low, and the micro-tile enable bit is set to zero to enable micro-tile memory accesses in the memory integrated circuit.

* * * * *